Feb. 12, 1957 J. P. ECKERT, JR., ET AL 2,781,446

PULSE CYCLING CIRCUIT

Filed March 28, 1952 13 Sheets-Sheet 1

INVENTORS
JOHN P. ECKERT, JR.
JAMES R. WEINER
ROBERT F. SHAW
ALBERT A. AUERBACH

BY George V. Eltgroth
Ralph W. E. Bitner
ATTORNEYS

INVENTORS
JOHN P. ECKERT, JR.
JAMES R. WEINER
ROBERT F. SHAW
ALBERT A. AUERBACH

BY George V. Eltgroth
Ralph W. Bitner
ATTORNEYS

INVENTORS
JOHN P. ECKERT, JR.
JAMES R. WEINER
ROBERT F. SHAW
ALBERT A. AUERBACH
BY
George V. Ugroth
Ralph H. E. Bitner
ATTORNEYS Feb. 12, 1957 J. P. ECKERT, JR., ET AL 2,781,446

PULSE CYCLING CIRCUIT

Filed March 28, 1952 13 Sheets-Sheet 4

INVENTORS
JOHN P. ECKERT, JR.
JAMES R. WEINER
ROBERT F. SHAW
ALBERT A. AUERBACH

BY George V. Eltgroth
Ralph W. Bitner
ATTORNEYS

PULSE CYCLING CIRCUIT

Filed March 28, 1952 13 Sheets-Sheet 5

INEVENTORS
JOHN P. ECKERT, JR.
JAMES R. WEINER
ROBERT F. SHAW
ALBERT A. AUERBACH

BY George V. Eltgroth
Ralph W. E. Bitner
ATTORNEYS

Feb. 12, 1957 J. P. ECKERT, JR., ET AL 2,781,446

PULSE CYCLING CIRCUIT

Filed March 28, 1952 13 Sheets-Sheet 6

INVENTORS
JOHN P. ECKERT, JR.
JAMES R. WEINER
ROBERT F. SHAW
ALBERT A. AUERBACH

BY George V. Eltgroth
Ralph K. E. Bitner
ATTORNEYS

INVENTORS
JOHN P. ECKERT, JR.
JAMES R. WEINER
ROBERT F. SHAW
ALBER A. AUERBACH

BY George O. Elgroth
Ralph W. E. Bitner
ATTORNEYS

Feb. 12, 1957 J. P. ECKERT, JR., ET AL 2,781,446

PULSE CYCLING CIRCUIT

Filed March 28, 1952 13 Sheets-Sheet 8

INVENTORS
JOHN P. ECKERT, JR.
JAMES R. WEINER
ROBERT F. SHAW
ALBERT A. AUERBACH

BY George V. Eltgroth
Ralph W. E. Bitner
ATTORNEYS

PULSE CYCLING CIRCUIT

Filed March 28, 1952 13 Sheets-Sheet 9

INVENTORS
JOHN P. ECKERT, JR.
JAMES R. WEINER
ROBERT F. SHAW
ALBERT A. AUERBACH

BY George Eltgroth
Ralph W. E. Bitner
ATTORNEYS

Feb. 12, 1957 J. P. ECKERT, JR., ET AL 2,781,446

PULSE CYCLING CIRCUIT

Filed March 28, 1952 13 Sheets-Sheet 10

INVENTORS
JOHN P. ECKERT, JR.
JAMES R. WEINER
ROBERT F. SHAW
ALBERT A. AUERBACH

BY George Fetherstonhaugh
Ralph E. Bitner
ATTORNEYS

Feb. 12, 1957 J. P. ECKERT, JR., ET AL 2,781,446

PULSE CYCLING CIRCUIT

Filed March 28, 1952 13 Sheets-Sheet 11

INVENTORS
JOHN P. ECKERT, JR.
JAMES R. WEINER
ROBERT F. SHAW
ALBERT A. AUERBACH

BY George Vittyeat
Ralph W. E. Bitner
ATTORNEYS

Feb. 12, 1957 J. P. ECKERT, JR., ET AL 2,781,446

PULSE CYCLING CIRCUIT

Filed March 28, 1952 13 Sheets-Sheet 12

INVENTORS
JOHN P. ECKERT, JR.
JAMES R. WEINER
ROBERT F. SHAW
ALBERT A. AUERBACH

BY [signature] [signature]
ATTORNEYS

Feb. 12, 1957 J. P. ECKERT, JR., ET AL 2,781,446

PULSE CYCLING CIRCUIT

Filed March 28, 1952 13 Sheets-Sheet 13

INVENTORS
JOHN P. ECKERT, JR.
JAMES R. WEINER
ROBERT F. SHAW
ALBERT A. AUERBACH

BY George Altgroth
Ralph E. Bitner
ATTORNEYS

United States Patent Office 2,781,446

Patented Feb. 12, 1957

2,781,446

PULSE CYCLING CIRCUIT

John Presper Eckert, Jr., Gladwyne, and James R. Weiner, Philadelphia, Pa., and Robert F. Shaw, Brooklyn, and Albert A. Auerbach, Levittown, N. Y., assignors, by mesne assignments, to Sperry Rand Corporation, New York, N. Y., a corporation of Delaware Application March 28, 1952, Serial No. 279,156

29 Claims. (Cl. 250—27)

This invention relates to electronic computing devices and more particularly to a control circuit which provides a series of timed pulses to a program-controlled automatically sequenced calculator.

Some of the features of the computer have already been described in connection with application Serial No. 783,328 filed by J. P. Eckert, Jr. and J. W. Mauchly, October 31, 1947, entitled "Memory System," now Patent No. 2,629,827; application Serial No. 32,168 filed June 10, 1948 by John W. Mauchly and J. P. Eckert, Jr., entitled "Data Translating Apparatus," now Patent No. 2,577,141; Patent 2,557,729, issued to J. P. Eckert, Jr. June 19, 1951, entitled "Impulse Responsive Network"; Patent 2,579,141 issued to J. P. Eckert, Jr., J. C. Sims, Jr., and I. L. Auerbach December 18, 1951, entitled "Structure for Electrical Apparatus"; and application Serial No. 155,628 filed April 13, 1950 by J. P. Eckert, Jr. and A. A. Auerbach, entitled "Signal Cycling Device."

A number of high speed electronic computers have been designed and constructed which have the property of being able to accept digital information and then perform an arbitrary sequence of operations on this information subject to a program control. In addition, the operations may be modified in accordance with conditions encountered during the performance of the various operations. Electronic computers of this type so far produced have represented considerable improvement in speed of performance over existing apparatus, yet many have required unduly large aggregates of circuit components and have the additional limitations of not being able to accept alphabetical characters. A further disadvantage lies in the fact that these prior art machines are not adapted for ready and convenient changeover from one problem to another.

Accordingly, it is a primary object of this invention to provide a new and novel computing apparatus with exceptional flexibility and greater storage capacity.

It is a further object of this invention to provide a new and novel computing system having improved checking facilities.

Another object of the invention is to provide a new and novel system of timed pulses for controlling the computer operations.

Another object of the invention is to provide a plurality of checking circuits for determining the correct timed sequence of the control pulses.

Another object of the invention is to provide gating circuits for transmitting predetermined timed pulses to an output circuit for control purposes.

Another object of the invention is to provide a primary pulse generator for controlling the sequence of timed pulses.

Another object of the invention is to provide a circuit for correcting any mistimed pulse which may gain or lose its timed position due to the variation of characteristics of the circuit elements.

Another object of the invention is to provide indicating devices for showing any variation of timing of the timed control pulses.

Other objects and advantages of the invention will be disclosed when the following specification is read in conjunction with the drawings in which:

Figs. 8 and 9 are to be joined to produce the entire circuit.

One feature of the invention includes a system of two recirculating delay lines of 7 and 13 pulse time durations. The delay lines are actuated through suitable gates by a master single pulse device and pulses are, therefore, available in each line delayed from one to seven pulse times in one line and from one to 13 pulse times in the other line. Coincidence gates are used to combine the recirculated pulses taken from delay points in both lines to produce coincidence pulses which may vary from one to 91 pulse times, the word length plus the space between words.

Another feature of the invention is the provision of a non-circulating delay line for providing control pulses having delay times of 85 to 91 and 1 to 20.

Another feature of the invention includes the use of duplicate recirculating lines with means for cross-checking the timed delay pulses in each line. Indicating means are provided for showing a signal and stopping the machine when the two delay lines are out of step or otherwise do not provide delayed pulses which show timed coincidence.

Another feature of the invention includes the use of the master clock pulse to control the operation of each pulse forming circuit. During the circulation of the pulses in the delay lines, a pulse forming circuit is inserted every six or seven pulse times and the transmittal of the circulating pulse through this circuit is governed by the clock pulse. This constitutes a retiming action.

Figure 1:
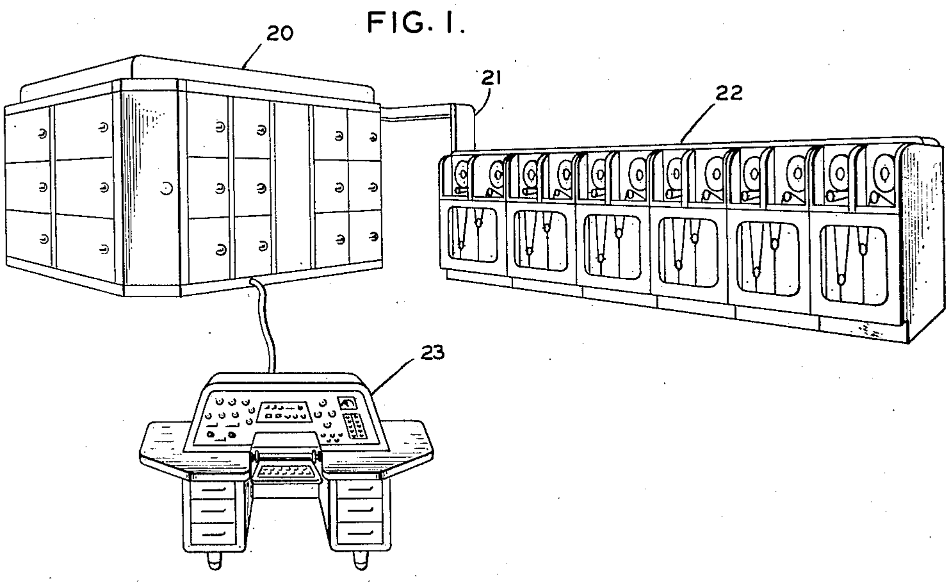
Figure 1 illustrates the main components of the computer shown in perspective.
Figure 2:
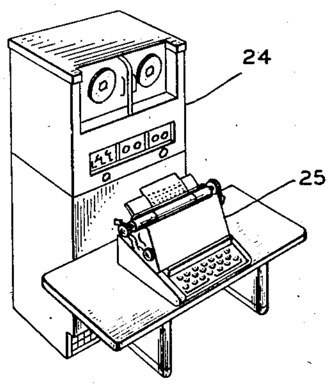
Figure 2 illustrates the typing unit which is employed to prepare a magnetic tape containing instructions and data for use in the main computer.
Figure 3:
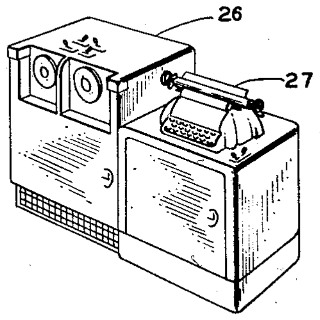
Figure 3 illustrates the printing unit which is employed to type the results obtained in the computer.

Referring now to Figures 1, 2, and 3, the computer comprises a main cabinet 20 which houses most of the computing and control circuits. It is connected by a cable duct 21 to a cabinet 22 which contains a plurality of tape reading and recording units. A master control unit 23 is connected by cable to the main cabinet and is used to start and stop the computing action and to otherwise control the computer operation. Figure 2 illustrates the recording unit which comprises a tape recording cabinet 24 and a manually operated typewriter 25 connected electrically to transmit coded pulses to the recording cabinet where magnetized areas are formed on a magnetic tape. There is no electrical connection between the typing unit of Fig. 2 and the computer unit of Fig. 1. The magnetic tape, after receiving the data and instructions of a particular problem, is taken from the recording unit 24 and placed in one of the reproducing units in cabinet 22. From this position it delivers its information to the computing unit 20.

It is generally convenient and advisable to place instructions on one tape and data on another. These two (or more) reels are then controlled to deliver their coded characters to the computing unit in the correct sequence. A similar problem may be solved by using the same instruction tape again but in conjunction with a different array of data.

The computer receives the instructions and data, performs the computations necessary and then sends the answer to another unit in cabinet 22 where the result is recorded on magnetic tape. After the finish of the computing cycle, the recorded reel is transferred to a printer unit shown in Fig. 3 which comprises a reading and decoding cabinet 26 and a means of printing the decoded characters 27. No electrical connection exists between the computer units and the printer. Several printers may be employed to print the answer since the result may be recorded on several tapes.

Figure 4:
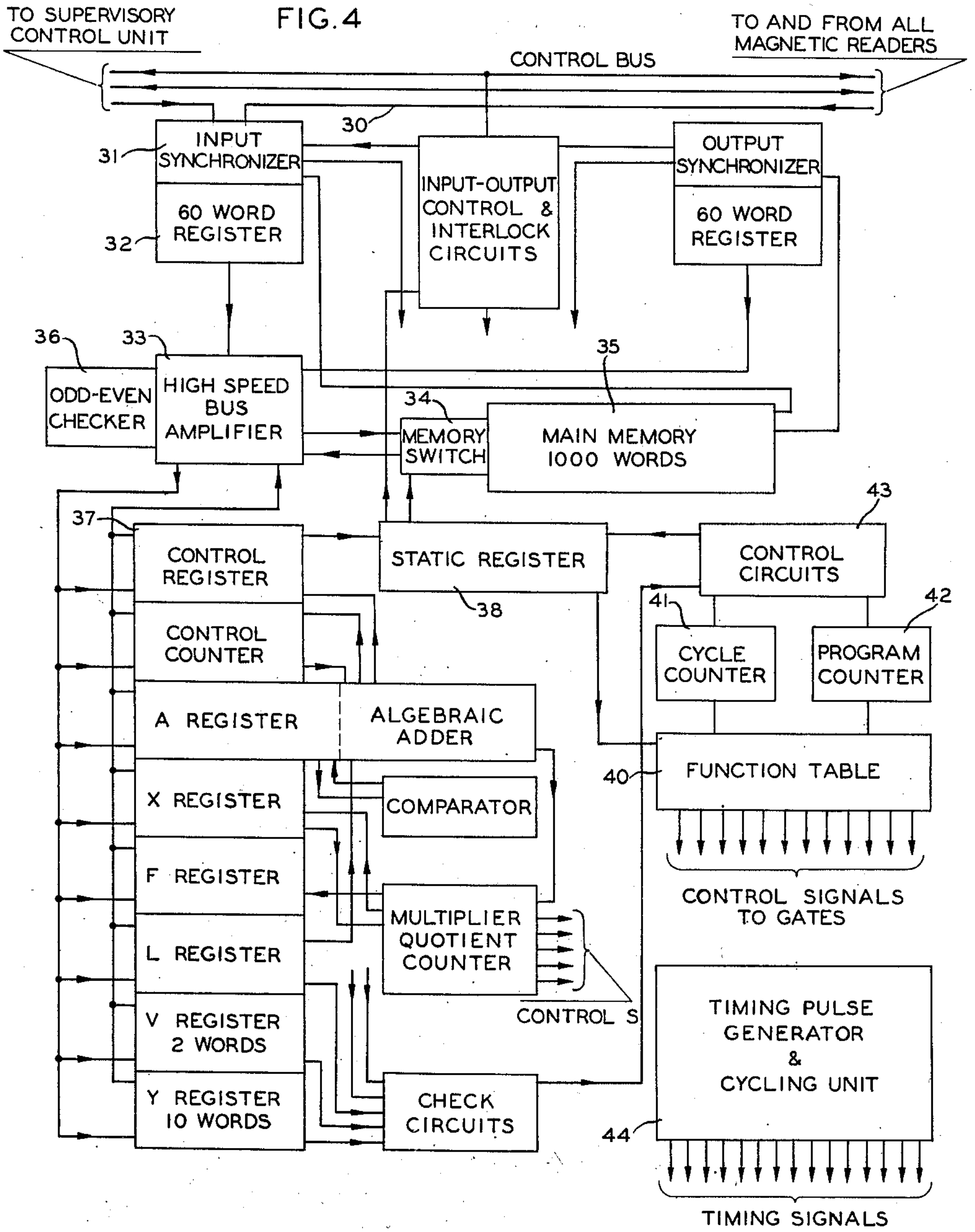
Figure 4 is a schematic block diagram showing all the components in the computing unit.

Referring now to Fig. 4, the computer components will be described generally without specific mention of the invention which is covered by the appended claims. The coded pulses from the magnetic readers are received over a conductor 30 and applied to an input synchronizer 31 and a 60-word circulating register 32. When the pulses first arrive, they are applied to an array of flip-flops which comprise a static storage system. From this storage system the data is given time sequence and sent to a one-word memory tank (one word—91 characters); from there to a 60-word memory tank, and finally through a high speed bus amplifier 33 through a memory switch 34 to the main memory tank 35. During the transfer through amplifier 33, the coded character pulses are examined for completeness by an odd-even checker 36.

From the main memory 35, information is delivered to various other registers and counters where the actual program steps are performed. Selected portions of the data can be taken from any section of the main memory and added, subtracted, multiplied, or divided by any other selected portion of data. Instructions for performing these program steps are delivered to a control register 37 which comprises a circulating memory tank for one word (91 characters). This word generally contains two instructions and the word is kept in the tank until both instructions have been obeyed and the calculations or transfers finished. The instructions are then sent to a static register 38 where they are stored. This register is connected to a function table 40 which decodes the instruction characters and opens or closes gates in accordance with a predetermined coded arrangement.

Other control circuits include a cycle counter 41, a program counter 42, and a system of control circuits 43 which govern the settings of the two counters.

It will be obvious from the above that a precise and exact system of timing is necessary for all the operations. This is especially true for the operations of gates which open and close to shift coded character pulses into or out of circulating delay lines or circulating mercury tanks. Timed pulses are needed for nearly all the pulse times within a word interval; that is, 91 pulses, each separated an equal time interval from adjacent pulses, must be available for assisting program control work. These pulses are generated by a timing pulse generator and cycling unit 44.

Figure 5:
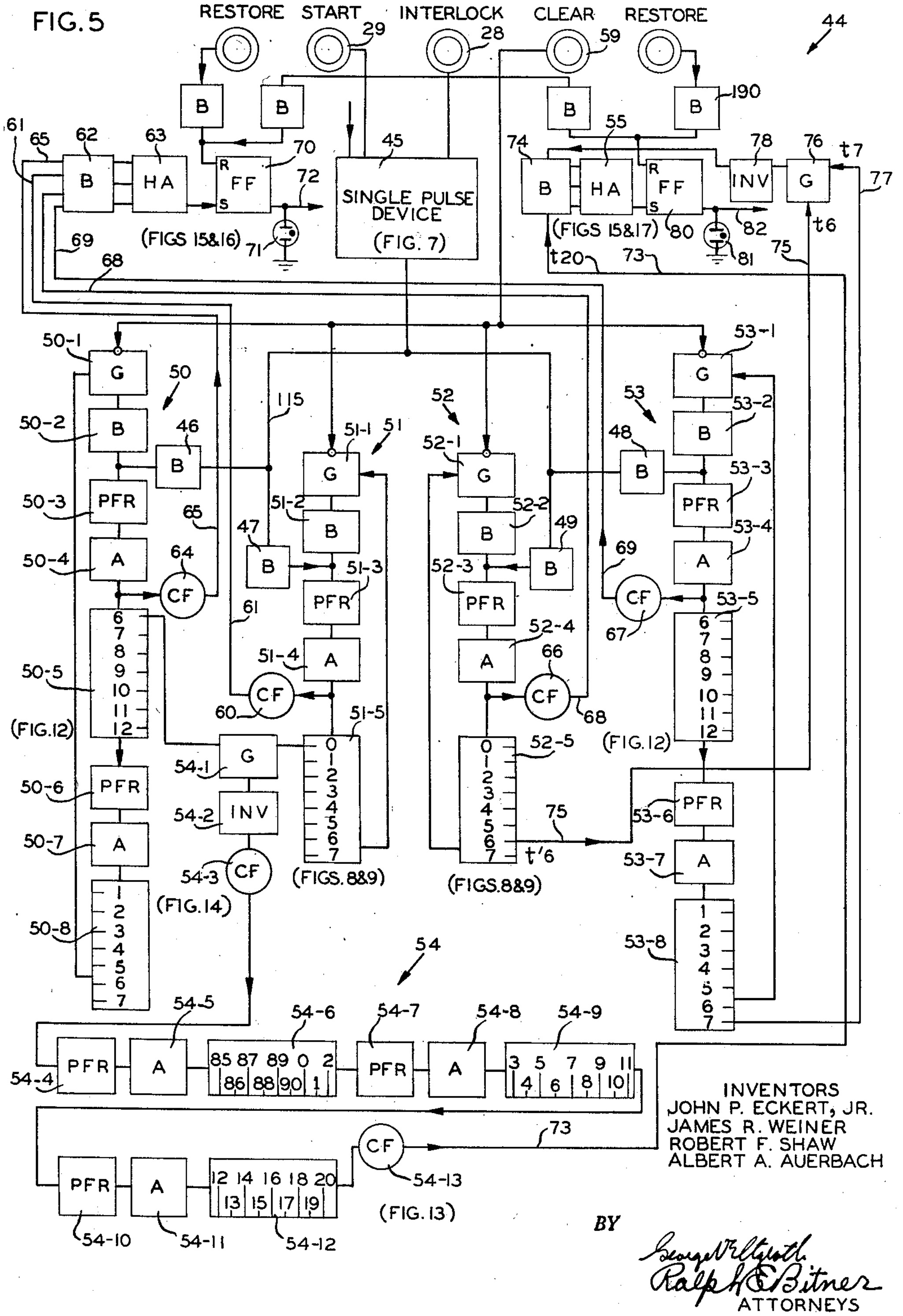
Figure 5 is a schematic block diagram showing the sub-components in the timing pulse generator and cycling unit.

The general organization of the cycling unit 44 is shown in Figure 5 where the various components are indicated in block. The circuit includes a single pulse device 45 controlled by an interlock switch 28 on the supervisory control panel 23 and a start switch 29, also on panel 23. The pulse sent out by generator 45 is applied to four buffer stages 46, 47, 48, and 49, and the output from the buffer stages is sent directly to the input circuits of four circulating delay lines 50, 51, 52 and 53 and to one dead ended delay line 54.

Figure 6:
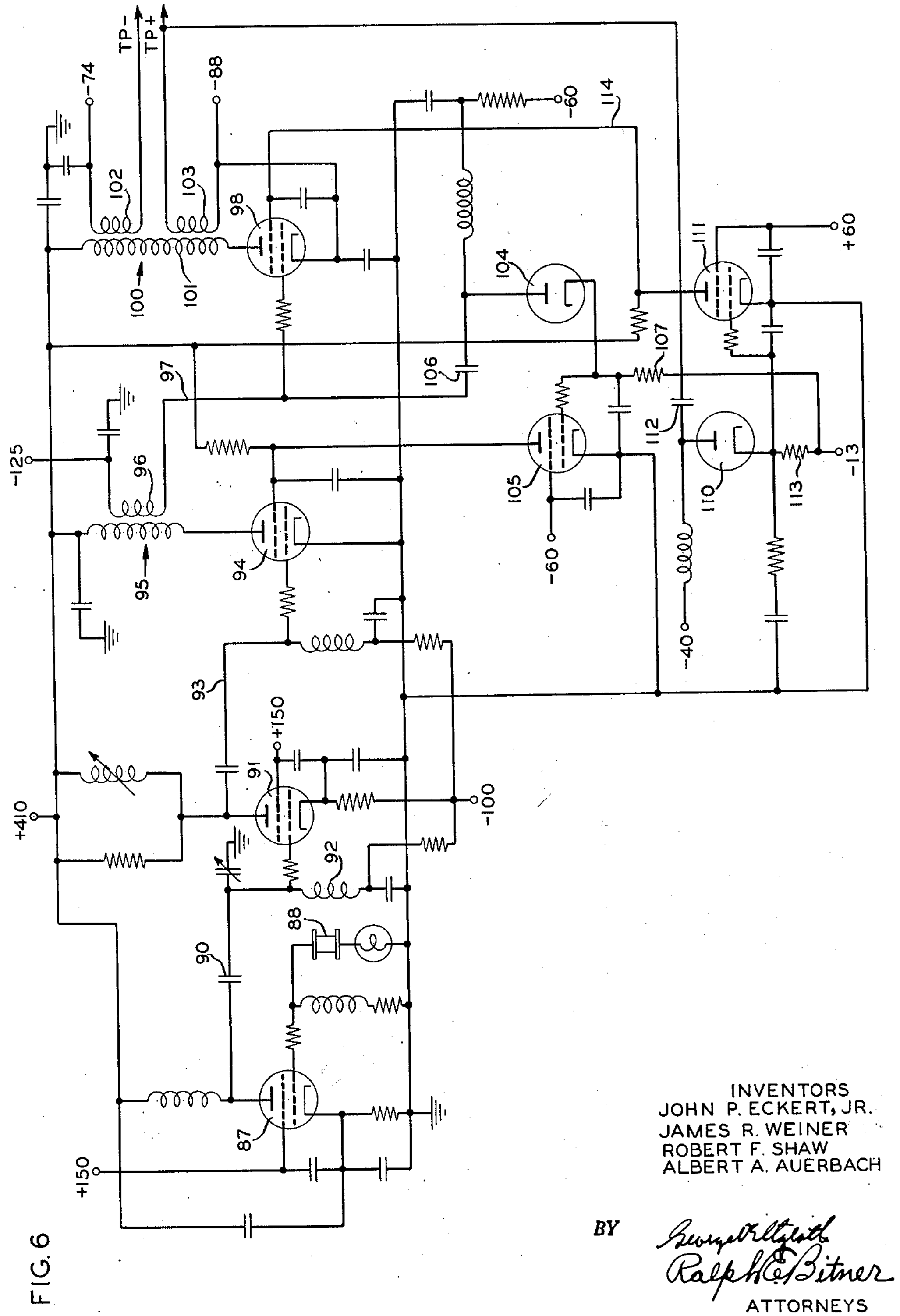
Figure 6 is a detailed schematic diagram of connections showing the master pulse generator which generates sharp control pulses, both positive and negative, for the entire computer system.

The single pulse device 45 is controlled by a master oscillator not shown in Fig. 5 but illustrated in detail in Fig. 6. The master oscillator is controlled by a crystal connected to a vacuum tube oscillator and includes a ringing circuit, a clipping circuit, and two pulse transformers which provide an accurately spaced series of positive pulses from one transformer and negative pulses from the other transformer. The pulse generator will be described in detail later. The positive pulses only are applied to the single pulse device 45 but both series of pulses are applied to each pulse-forming circuit 50–3, 51–3, 50–6, 54–4, etc.

Delay line 50 is composed of a plurality of circuits in series connection, designed to preserve the wave form and magnitude of the applied pulse. These component circuits include a gate 50–1, a buffer circuit 50–2, a pulse former circuit 50–3, an amplifier 50–4, a first 6-section delay line 50–5, a pulse former 50–6 which is identical to 50–3, an amplifier 50–7 identical to 50–4, and a second 7-section delay line 50–8. The output of the second delay line 50–8 is connected to gate 50–1 to provide for the recirculating operation.

Delay line 51 is similar to line 50 except that it provides a delay of only 7 pulse times and has only one delay line circuit. A gate 51–1, buffer circuit 51–2, pulse former circuit 51–3 and amplifier 51–4 are all similar to the components of line 50.

The delay line 51–5 provides a time delay of 7 pulse times. The output of this circuit is applied to gate 51–1 to provide for the recirculating operation.

Delay line 52 is an exact copy of delay line 51 except for a few taps for testing purposes.

Delay line 53 is an exact copy of delay line 50 except for a few connections for cross-checking. The internal components are identical. Delay lines 50 and 53 are each capable of recirculating an applied pulse with a delay of 13 pulse delay times and also of furnishing 13 timed voltage pulses, each differing from its adjacent pulse by one pulse time.

The fifth delay line 54 is similar to the other four delay lines except that it is not recirculating, has a total of 27 delay pulse times, and is divided into three sections of 9 pulse times each. The line comprises an input gate 54–1 which is connected to the first delay tap on delay line 50 and the first delay tap on delay line 51. The gate is connected to an inverter stage 54–2 which in turn is connected to a cathode follower amplifier stage 54–3. Then, in sequence, the pulse is applied to a pulse former 54–4, an amplifier circuit 54–5, and the first section of the delay line 54–6 which delays the pulse by nine pulse times. A second and third section of this delay line 54–9 and 54–12 are each preceded by an amplifier circuit 54–11 and 54–8 and by a pulse former 54–10 and 54–7. The output of this line is applied to a cathode follower amplifier 54–13 which is connected to a half-adder checking circuit 55 for purposes of determining the accuracy of the pulse traveling through the 27-pulse time delay line in comparison with other pulses.

Two cross-checking circuits are employed for continuously checking the accuracy of the pulses in all five lines: 50, 51, 52, 53 and 54. For this purpose, a half-adder circuit and flip-flop are used. These circuits are shown in detail in Figures 15, 16, and 17 and will be described hereinafter.

As shown in Fig. 5, circulating line 51 is tapped between the amplifier 51–4 and the delay line 51–5. These pulses are connected through a cathode follower amplifier 60 and applied to conductor 61 which is connected to one section of a buffer circuit 62 and a half-adder circuit 63. Delay line 50 is also tapped between amplifier 50–4 and delay circuit 50–5 by a cathode follower amplifier 64. The output of this amplifier is transmitted over conductor 65 to the same buffer circuit 62. In a similar manner, recirculating lines 52 and 53 are connected by cathode follower amplifiers 66 and 67 and conductors 68 and 69 to the buffer circuit 62.

When the four delay lines are started by a start pulse from generator 45, four coincident pulses will be sent to the buffer circuit 62. Every 91 pulse times thereafter the four pulses will be coincident. At other times, lines 50 and 53 send coincident pulses to the buffer circuit every 13 pulse times and lines 51 and 52 send coincident pulses every seven pulse times. In order to receive and test these pulses for coincidence, the buffer circuit is divided into four sections as will be explained in detail hereinafter.

Pulses applied simultaneously to all four input conductors 61, 65, 68, and 69 produce no output pulse from the half-adder circuit. Also, a single pulse on either line 61 or 65 will produce no output when it is coincident with a similar pulse on conductor 68 or 69. However, a single pulse on any of the four input conductors causes the half-adder 63 to transmit a pulse to the flip-flop circuit 70 and two pulses on conductors 61 and 65 or on conductors 68 and 69 will also produce the same action. In this event, the flip-flop circuit is actuated and a rise in voltage is sent to conductor 72, lighting the neon lamp 71 and stopping further computing action by means of a control circuit (not shown).

A second checking circuit is employed to check the time coincidence of the output pulses from lines 52, 53, and 54. For this purpose, the last section of the 27-pulse time line is transmitted through a cathode follower amplifier 54–13 to conductor 73 and a buffer circuit 74. The last section of line 52 and the last section plus one of line 53 are connected by conductors 75 and 77 to a coincidence gate 76. The pulse leaving the gate is inverted in amplifier 78 and then applied to buffer circuit 74. If these delay lines are all operating properly, coincident pulses will be applied to buffer circuit 27 pulse times after the start of the operation and 91 pulse times after each coincidence pulse. If the timing is in error or if any one of the three pulses is absent, the half-adder 55 sends an output pulse to the flip-flop 80, causing it to be actuated and sending a voltage rise over conductor 82 to light neon lamp 81 and cause a control circuit (not shown) to stop the machine.

It will be noted that the pulse time designations shown in Fig. 5 do not all start at zero time when started by the pulse generated by the single pulse device 45. The designations are purely arbitrary and have been so chosen because it has been found convenient to start the "word" a few time intervals after the delay lines are started. For control purposes during the various computing operations, pulses at times 84 to 90 are needed and it requires less equipment to take these pulses from a single line rather than from a coincidence gate operating from two delay lines.

In Fig. 5 only those delay line taps are shown which are necessary for the recycling operations and the operation of the checking circuits. Actually, the computer uses signals from all the taps on delay line 54 except two, the signals from all the taps on delay lines 51 and 52 and nineteen other sigals derived from coincidence gates such as 54–1. Since these signals are used in parts of the computer which do not concern the cycling unit, they have not been shown in the drawings. In addition to the wiring shown in Fig. 5, it is to be understood that all the pulse former circuits, such as 50–3, 51–3, etc., are connected to the master pulse generator and receive therefrom both positive and negative timing pulses.

*Master pulse generator (Fig. 6)*

Figures 9, 10, 11:
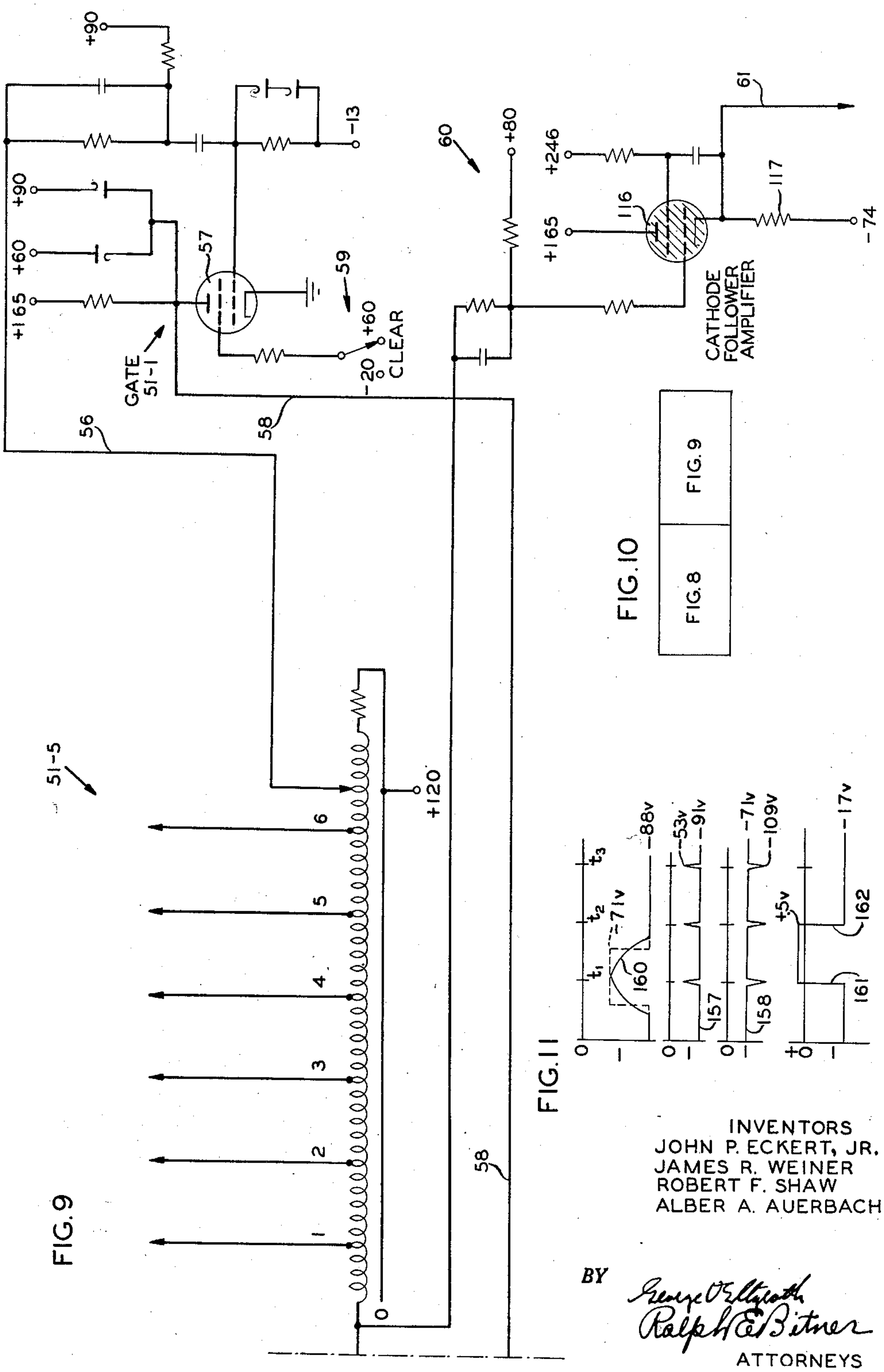
Figure 10 is a diagram showing how
Figure 11 is a series of graphs showing the wave form and timing of some of the pulses generated and their relative time relationship.

Details of the master pulse generator and its associated circuits are shown in Fig. 6. The generating system comprises a master oscillating circuit with a pentode tube 87 controlled by a quartz crystal 88. This is the usual type of crystal type oscillator and generates a sine wave which is applied through an accompanying capacitor 90 to an amplifier circuit containing a pentode tube 91 and a highly resonant circuit 92. Tube 91 is self-biased by a cathode resistor to a value close to the cut-off point so that, under normal operation, there is no grid current and the anode-cathode current is very small. When an oscillation is applied to this circuit, the inductor 92 produces damped oscillations because of its inductance and its distributed capacity. Only the positive parts of each cycle are impressed on the control grid and the output from this stage is transmitted over conductor 93 to a clipping stage which includes a tube 94 and a pulse transformer 95. The control electrode of tube 94 is biased considerably below the cut-off point and, therefore, only the very peaks of the pulses from tube 91 produce current in the anode circuit. These peaks, or positive pulses, pass through the primary winding of pulse transformer 95 and are converted from a high-voltage low-current pulse to a comparatively low-voltage high-current pulse in the secondary winding 96. Secondary winding 96 is biased to a negative 125 volts so that the output pulse transmitted over conductor 97 is a positive going pulse, varying from minus 125 up to minus 55 volts. This input voltage is applied to the grid of a driving tube 98, the cathode of which is biased at minus 88 volts, thereby ensuring that the peaks of the received pulse will cause current in the anode circuit. The anode circuit contains a second pulse transformer 100, having a primary winding 101 and two secondary windings 102 and 103. Winding 102 is biased minus 74 volts and is wound in such a manner that it produces a sharp negative going pulse for use in other circuits in the computer. Secondary winding 103 is biased at minus 88 volts and is wound in such a manner that it produces a sharp positive pulse which is also used in other parts of the circuit. While only one driver circuit is shown, the computer actually employs 11 of these circuits, all fed from the same tube 94. However, the other 10 driver circuits are identical with the one shown in Fig. 6 and need not be duplicated. In order to control the pulse heights, two automatic gain control circuits are employed, each of which includes a diode and a tetrode. The first gain control circuit includes diode 104 and tetrode 105, and controls the gain of amplifier tube 94. A coupling capacitor 106 applies part of the output pulse from winding 96 to the anode of diode 104 and as this pulse increases, the current through the tube increases, causing a variation in potential drop across a resistor 107, varying the potential of the control electrode in tube 105 and varying, in a similar manner, the screen grid in tube 94. This variation causes the gain of tube 94 to be lowered, thereby reducing the pulse through the pulse transformer and assuming a stabilized output condition. The positive output pulse from secondary winding 103 is also controlled by a similar circuit which includes a diode 110 and a tetrode 111, this action being exactly similar to the previously described gain control circuit. An increase in the positive output pulse sends a small current through coupling capacitor 112, through the diode 110, changing the potential drop across resistor 113 and thereby impressing a changed grid potential on the control grid of tube 111. This change is communicated over conductor 114 to the screen grid of driver tube 98, reducing its gain and returning the output pulse to a desired stabilized condition. The result of this generator action is a series of positive and negative pulses occurring simultaneously. The voltage graphs of these pulses are shown in Fig. 11.

Figure 7:
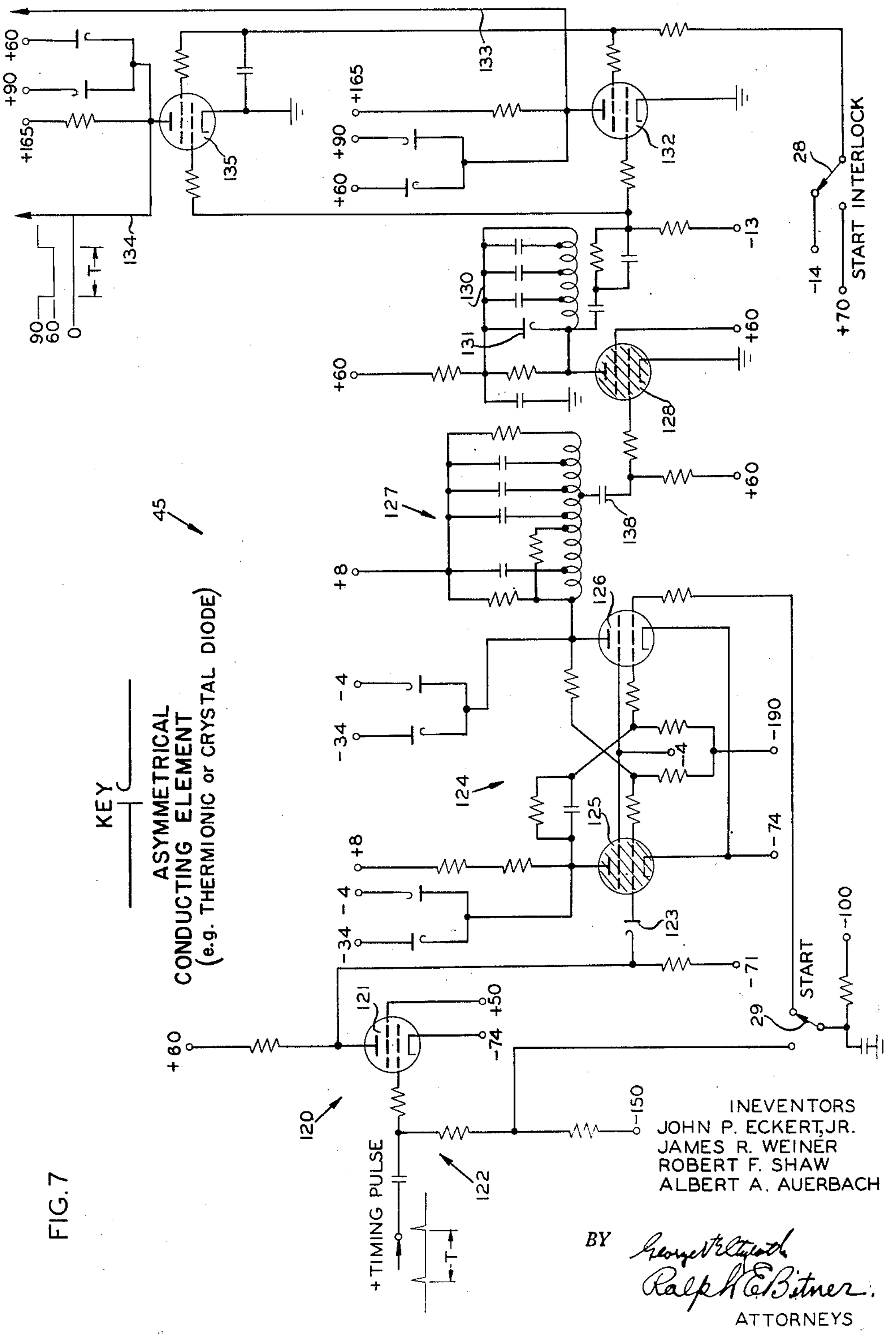
Figure 7 is a detailed schematic diagram of connections showing a single pulse device which produces square topped waves for the circulating system.

*Single pulse circuit (Fig. 7)*

A single pulse circuit is provided for delivering a pulse at the start of the computer operation. Only a single pulse is necessary for each problem. The pulse is generated in a pulse-forming circuit 45, shown in block form in Fig. 5, and delivers the pulse to four buffer circuits 46, 47, 48 and 49. These circuits apply the start pulse to the four delay lines 50, 51, 52 and 53, after which time the pulses circulate through the delay lines and are controlled in their timing by positive and negative pulses derived directly from the master oscillator.

The single pulse circuit comprises an input converting stage 120 which includes a tube 121 and an input coupling circuit 122. Stage 120 is coupled through a diode 123 to a flip-flop circuit 124. This circuit is of functional design and includes tubes 125 and 126, the former of which is in a normally conducting state. The output of flip-flop circuit 124 is applied to a delay circuit 127 which delays the drop in voltage a time interval which is approximately equal to one half of the time interval between input pulses. The delayed drop in voltage is applied to an amplifier tube 128 which is normally conducting and the positive pulse sent out by this tube is applied to a ringing circuit 130 which is carefully adjusted to provide a positive pulse of exactly the correct time duration. The resonant circuit 130 is shunted by a diode 131 which has no influence on the positive part of the cycle. However, this diode acts as a short circuit for any negative voltage set up in the resonant circuit. Therefore, the reduction of current through tube 128 produces a single positive pulse of predetermined duration which is applied to the control electrode of amplifier tube 132. This tube is normally nonconducting and has a double limiter circuit connected to its anode. This limiter circuit comprises two diodes, one connected to a 90-volt supply and the other connected to a 60-volt supply. It will be obvious that the potential of the anode is limited to excursions from 90 down to 60 and back to 90 again. These variations provide the desired output pulse which is transmitted over output conductor 133 and, also, from a duplicate amplifier stage a pulse is sent out over conductor 134 from stage 135. The duplication of output circuits is provided in order to produce the power necessary. Two control switches are provided. One is a start switch 29 and the second is a start interlock switch 28. With the start switch in its nonoperating position, a voltage of minus 150 is applied to the input converter tube 121, disabling it from responding to the input timing pulses. Start switch 29 also puts a negative voltage of 100 volts on tube 126, thereby preventing the flip-flop combination from operating. The start interlock switch 28 in its normal position applies a voltage of −14 volts to the screen grids of output tubes 132 and 135, thereby preventing them from transmitting an output pulse. In order to operate the circuit, the start interlock switch 28 is first operated to put the output tubes 132, 135 into operating condition by increasing the screen grid voltage to +70 volts. Then the start switch 29 is operated, permitting the control grid of tube 126 to assume its normal potential and raising the voltage of the control electrode of input tube 121 from −150 to −100 volts. The first input pulse arriving from the master oscillator is applied to tube 121, causing it to send a sharp negative pulse to the flip-flop circuit 124. Conduction is transferred from tube 125 to tube 126 and the negative drop in voltage is applied to delay circuit 127. The delay circuit is coupled to normally conducting tube 128 by a capacitor 138. Therefore, only a sharp negative pulse of short duration is applied to the amplifier tube. This means that amplifier tube 128 has its anode-cathode current reduced to zero for a short time, thereby applying a positive pulse to the resonant circuit 130. The values of the circuit components in this resonant circuit are selected so that the pulse applied to tube 132, has a desired time duration, which time controls the length of the output pulse. The pulses sent out over conductors 134 and 133 are applied to the delay lines as mentioned above and these pulses, after being started in their circulating excursions, are further controlled by positive and negative pulses from the master oscillator. It is, therefore, important to have a time agreement between the first start pulse and succeeding timing pulses sent out by the master oscillator. Since it is impossible to produce a desired square-top output wave without a certain amount of time delay, an additional delay has been added in order to produce an over-all delay of exactly one pulse time duration. This additional delay, which is adjustable, is provided by circuit 127. One embodiment of this circuit uses master oscillator timing pulses having a period of .44 microseconds. The timing pulses are only .08 microseconds wide, using the circuit shown in Fig. 7. Delay line 127 was adjusted an over-all delay of .19 microseconds and, with this setting, the output pulses were exactly one pulse time delayed after the input pulse.

After the operator has operated both switches and started the pulse, switch 29 is again returned to normal. This puts a negative pulse on the control electrode of tube 126 and causes the conduction in that tube to be transferred back to tube 125. The resetting of the flip-flop circuit sends a positive pulse through delay line 127 which is applied to tube 128, causing its normally conductive current to be increased. This causes no further action in the circuit because a negative pulse applied to the resonant circuit 130 will be immediately short-circuited by diode 131 and no pulse of any kind will reach output tubes 132 or 135. After the start switch is returned to normal, the start interlock switch is also returned to normal, placing a potential of −14 on the screen grids of the two output tubes and preventing further conduction. The two switches, as above described, have been incorporated into this circuit as a safety precaution to insure that the accidental touching of either one of the switches will not send a start pulse to the delay lines after the machine has been started. It will be obvious that the operation of either one of the switches alone will result in no output pulse.

*Delay lines (Figures 8 to 13, inc.)*

Figure 8:
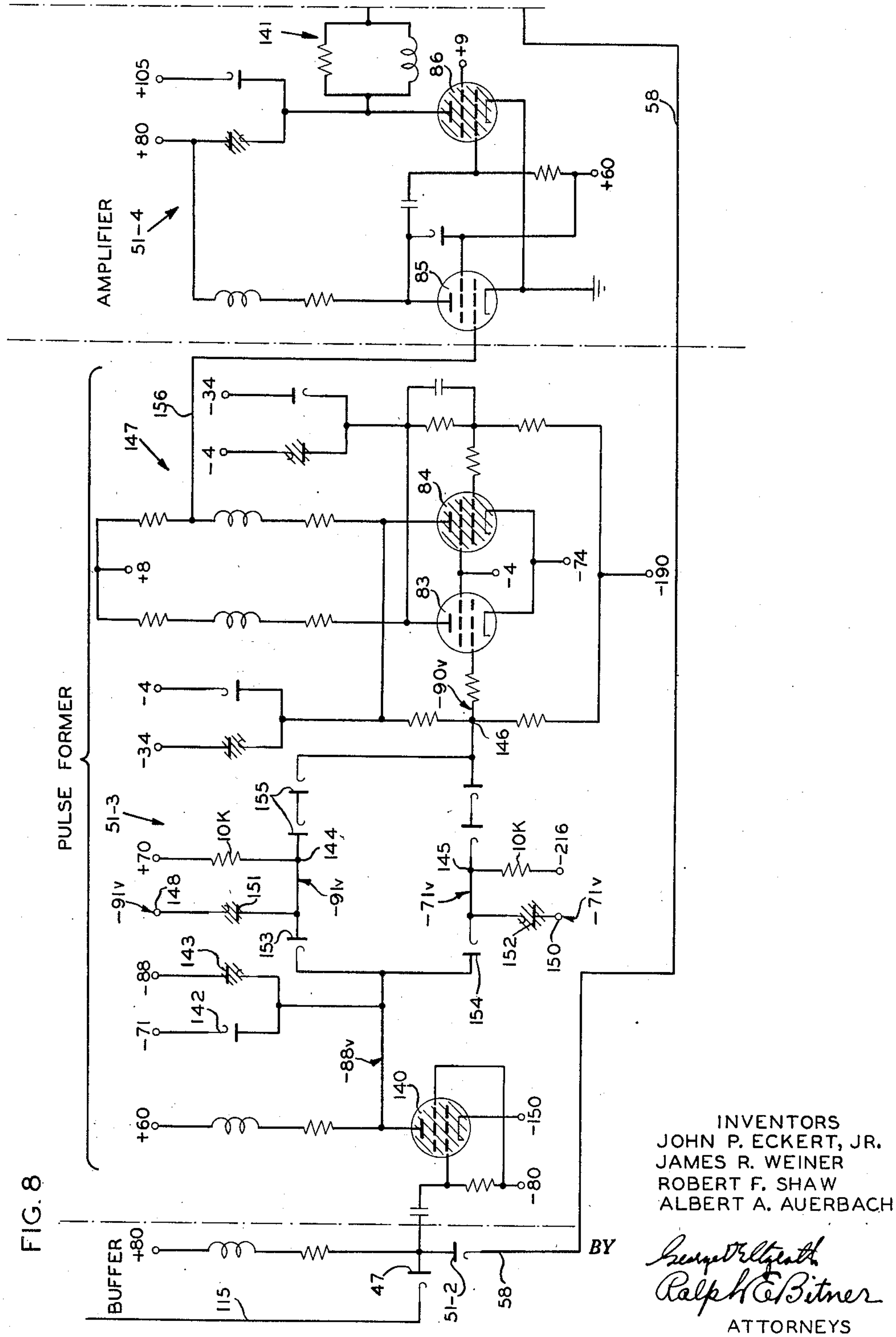
Figures 8 and 9 are a detailed schematic diagram of connections showing one of the circulating delay line arrangements.

Referring now to Figures 8 and 9, a complete recirculating delay line is shown in detail. This line represents the details of lines 51 and 52 shown in block form in Fig. 5. Gate 51–1 is shown at the right side of Fig. 9 and comprises one input conductor 56 which connects part of the delay line 51–5 with an input circuit and the control electrode of a tetrode vacuum tube 57. A second input circuit is derived from a clear switch which normally applies a potential of 60 volts to the second grid electrode and thereby contributes to the operation of gate 51–1, causing tube 57 to function as an amplifier and send output pulses over conductor 58. When the switch 59 is operated, a voltage of −20 volts is applied to the second grid electrode and no output pulses can be generated.

When the system is in operation, the pulses sent over conductor 58 are applied through a buffer diode circuit 51–2 to a pulse former circuit 51–3 where the pulses are reshaped and retimed. This circuit comprises an input vacuum tube 140 which is normally conducting, a clock gate circuit where timing pulses from the master oscillator are received, and a flip-flop circuit where the new retimed pulse is generated. The details of the pulse-former circuit will be disclosed during the description of the operation of the device. The retimed and reshaped pulses are applied to a two stage amplifier 51–4 which includes tubes 85 and 86 and an output compensation circuit 141. Then the pulses are applied to delay line 51–5 which comprises a series of inductors in series connected to an array of capacitors in parallel and is a well-known type of circuit component used for delaying or slowing down the transmission of electrical impulses. The delay line shown is made to delay the applied pulses about seven pulse times; that is, a time duration equal to seven periods of the master oscillator wave. The end of the line is terminated by a resistor to absorb any energy that might be reflected and then the end terminal is adjusted to pick off pulses which are six and one-half pulse times later than the pulses at the other end of the line. The reason for the six and one-half timing is due to the fact that half a pulse is dropped during the retiming and reforming operation as will be explained later. The six points intermediate the line ends are all available for timing pulses for computer use. Each of these pulses occur once every seventh pulse and are useful in digit and letter formation circuits since such character arrays always comprise seven pulse times.

A cathode follower amplifier 60 is tapped to the zero tap on the delay line and is used to send a pulse to a checking circuit. This stage includes a tube 116, an input circuit to the control electrode, a cathode resistor 117, and an output conductor 61 connected to the cathode.

Now, having described the delay line generally, reference will be made to specific circuit details and the circuit operation. The line is started, at the beginning of a computer operation, by a single pulse sent out by the single pulse device 45 (Fig. 5). This pulse is transferred by conductor 115 to buffer diode 47 where a negative pulse is passed due to the +80 volts supplied to the diode anode. The pulse is applied to the control electrode of normally conducting tube 140, causing it to become nonconducting and raising the voltage of its anode from −88 volts to −71 volts. Diodes 142 and 143 with their associated voltage supplies act as a double limiter circuit to hold the anode voltage within definite desired limits. Figure 8 shows the pulse former circuit 51–3 in its quiescent state with no buffer input and no master oscillator pulses applied. Under these conditions, conductor 144 and 145 are both at the same potential as their associated supply terminals 148 and 150. The anode of tube 140 is at −88 volts and conductor 146 connected to the input circuit of tube 83 is at −90 volts. Tube 83 is nonconducting while tube 84 is conducting. These two tubes are part of a flip-flop stage 147 which produces the retimed and reshaped pulse.

As noted previously, both the positive and negative pulse trains from the master oscillator are applied to the pulse forming circuit. The positive pulses shown in the graph in Fig. 11 are applied to terminal 148, while the negative pulses are applied to terminal 150. When these pulses are applied without an input pulse to tube 140, there is no output pulse sent to the flip-flop stage 147. The positive going pulse applied to terminal 148 changes its potential from −91 volts to −53 volts. The negative pulse applied to terminal 150 changes its potential from −71 volts to −109 volts. These changes in potential are not communicated to the output circuit because diode 151 becomes non-conducting as soon as terminal 148 is increased to −88 volts. At this time diode 153 becomes conducting and maintains conductor 144 at −88 volts. When terminal 150 is reduced to −109 volts by the master oscillator pulse, diode 152 becomes nonconducting at −88 volts and diode 154 becomes conducting, holding conductor 145 at −88 volts. Because of these changes and the fact that input conductor 146 is normally at −90 volts, diodes 155 conduct and reduce the potential of conductor two volts to −88. This change has no effect on the flip-flop circuit.

If a pulse is now applied over conductor 58 through diode buffer 51–2 to cut off the conduction in tube 140, the potential of its anode rises to −71 volts. In the absence of timing pulses from the master oscillator, no pulse will be transmitted through the gate system since conductor 145 is normally at the same potential and conductor 144 is normally at a more negative potential, making diode 153 nonconducting. When the timing pulses are applied (with anode of tube 140 at −71 volts), a positive pulse is transmitted to tube 83, causing it to conduct and actuating the flip-flop circuit, making tube 84 nonconductive. This is due to the fact that most of the value of the positive-going pulse applied to terminal 148 (−91 volts to −53 volts) can be applied through diodes 155 to conductor 146.

When the input pulse to tube 140 is removed and the master timing pulses again applied, the condition is the same as described above; that is, the conductor 146 is reduced to a potential of −88 volts. In the first condition, when the flip-flop circuit was in a restored condition, there was no result because the input conductor was at substantially that same potential. Now, with the flip-flop circuit in an actuated condition, the input conductor is at −74 volts and a decrease to −88 volts causes the flip-flop circuit to be restored again.

When the flip-flop circuit is actuated, it sends a positive rise in voltage over conductor 156 to tube 85 which is rendered conductive, sending a negative drop in voltage to tube 86 which is rendered nonconductive. This action sends a positive rise in voltage through circuit 141 to delay line 51–5. When the flip-flop circuit is restored, reverse results are obtained; a negative drop in voltage is sent over conductor 156, making tube 85 nonconductive and restoring the conductivity of tube 86. A negative drop in voltage is sent through circuit 141 to delay line 51–5.

The retiming and reshaping action of the pulse forming circuit may be more fully understood by reference to the graph of voltages shown in Fig. 11. The recirculating pulse which arrives over conductor 58 is degraded by its passage through the delay line. It has been delayed six and one-half pulse times; hence it will arrive at the pulse forming circuit out of time with the master timing pulses shown at 157 and 158. The delayed pulse produces an excursion from −88 volts to −71 volts in the anode circuit of tube 140 and this wave form is shown in the solid line 160 in Fig. 11. The first positive-going pulse of train 157 actuates the flip-flop and produces a voltage rise in the output circuit of tube 86 which rises from −17 volts to +.5 volt shown in the graph at 161. The second negative-going master timing pulse from train 158 restores the flip-flop circuit as described above and produces the fall in voltage 162 shown in the graph. It will be obvious that the new pulse sent to the delay line is correctly formed by flip-flop action and is correctly timed by two of the timing pulses from the master oscillator. It should be evident from the graph that one half a pulse time is used in the reforming action and while the recirculated pulse arrives six and one half pulse times delayed, the output pulse is delayed seven pulse times. It should also be evident that considerable latitude in timing is permissible in the recirculated pulse without causing an error in the resulting pulse output.

Figure 12:
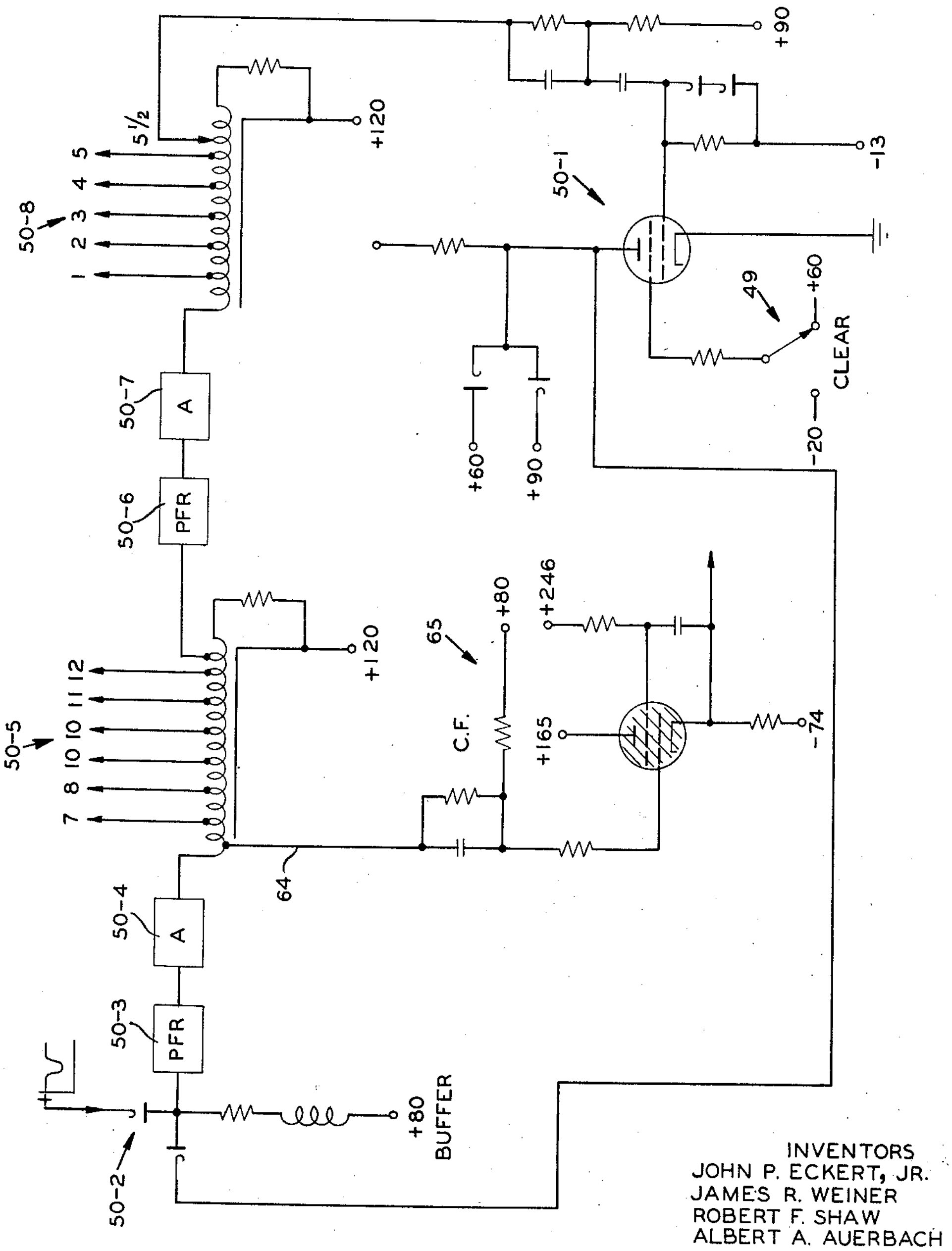
Figure 12 is a detailed schematic diagram of connections of one of the thirteen pulse time recirculating delay lines with the pulse forming circuits and amplifier circuits shown in block.

The delay line described above is one of five lines used in the computer operation. Line 52 is exactly the same as line 51 except for some of its output taps which in no way affect the internal operation. Lines 50 and 53 are also alike and are shown in Fig. 12 where some circuits are shown in block form. Gate 50–1 is made part of the recirculating circuit in order to introduce a clear or inhibiting action by switch 49 to stop the recirculating pulses without affecting the remainder of the circuit. Buffer stage 50-2 is similar in action and design to stage 51-2 described above. The pulse former circuit 50-3 and amplifier circuit 50-4 are identical to circuits 51-3 and 51-4 and need not be described again.

Delay lines 50 and 53 cause a delay of 13 pulse times and are each divided into two parts, one comprising a delay circuit 50-5 of 6½ pulse times, and the second comprising a delay circuit 50-8 of 5½ pulse times. The two pulse formers each provide a half pulse time delay, making the overall times 7 and 6 or a total of 13.

Figure 13:
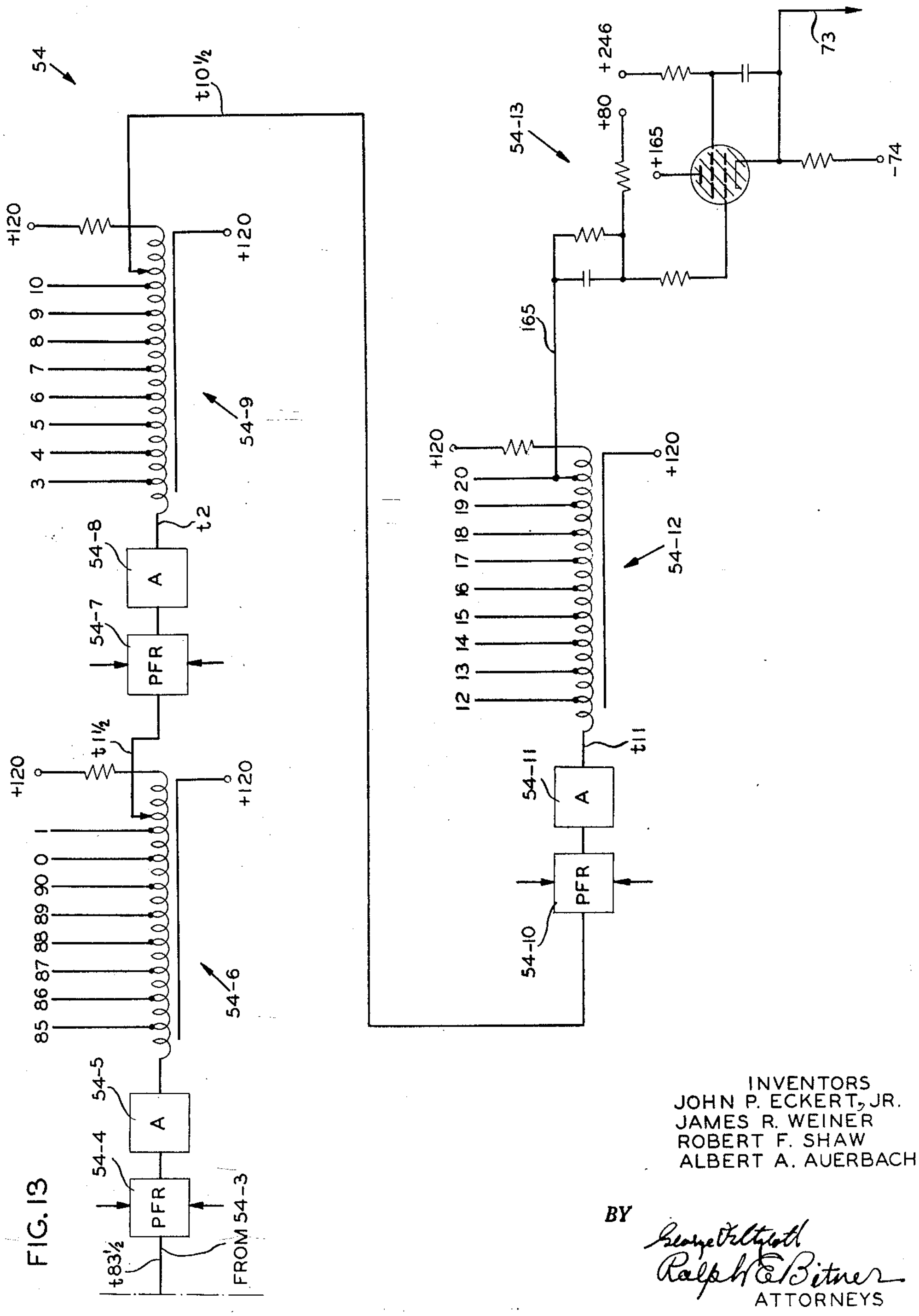
Figure 13 is a detailed schematic diagram of connections of the twenty-seven pulse time delay lines, part of which is shown in block.
Figure 14:
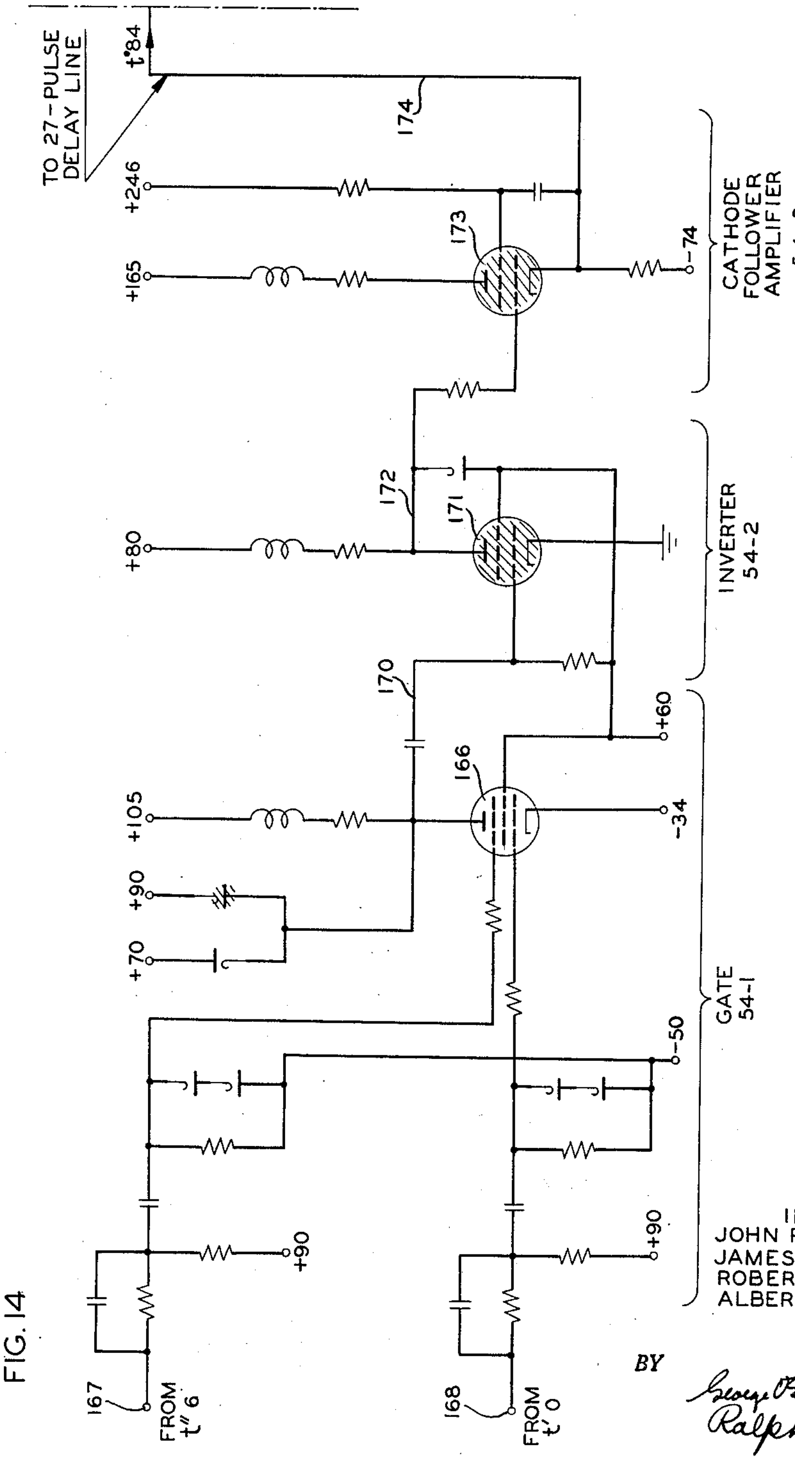
Figure 14 is a schematic diagram of connections of one of the coincidence gates together with an inverter and cathode follower amplifier.

Delay line 54 is a 27-pulse-timed delay circuit which is not recirculating and is illustrated in Fig. 13. The line is divided into three parts, each including a delay circuit of 8½ pulse times, except the last section which produces a delay of 9 pulse times. This circuit derives its input pulse from a coincidence gate shown in detail in Fig. 14. The input circuits to the gate are connected to the first tap on delay line 50 and the first tap on delay line 51. These taps are adjusted to give a pulse which has a time value of approximately 83½. When this pulse is applied to pulse former 54-4 (Fig. 13), it is delayed another half pulse and is applied to the delay circuit 54-6 at time value equal to 84. In traversing the delay circuit, the pulse suffers a time delay of 8½ pulse times, emerging at an assigned time value of 1½. This pulse is applied to pulse former 54-7 which again delays the pulse by one half a pulse time and applies the retimed and reshaped pulse to delay circuit 54-9 at a time assigned value of 2. Delay circuit 54-9 is identical to delay circuit 54-6 and delays the pulse 8½ pulse times. The pulse which emerges from the second delay circuit has an assigned value of 10½ and when this is applied to the third pulse former 54-10, it again suffers a half pulse time delay and is applied to the third delay circuit 54-12 at time 11. The last delay circuit introduces a time delay of exactly 9 pulse times and the output of this circuit is supplied over conductor 165 to cathode-follower amplifier stage 54-13. The output of this amplifier stage is transmitted over conductor 73 to buffer stage 74 and half-adder 55 for a check comparison with two other pulses, one of which is derived from line 52 and the second of which is derived from line 53, multiplied to a coincidence gate 76. The theory of operation of the line 54 shown in Fig. 13 is the same as that disclosed in the description of line 51, the only difference being that the pulse which traverses line 54 is not recirculated. This line receives a pulse only once for every 91 pulse times and is used in the computing circuit because a large number of desired pulses occur at the times indicated on the taps of this line; namely, the last 7 pulses at the end of each word and the first 20 pulses at the start of each word.

The use of a non-circulating line offers the advantage that a coincidence gate is not necessary. A simple buffer circuit installed between the tap and a utilization circuit is all that is necessary when these pulses are used. In order to derive a pulse which occurs only once for every 91 pulses and which is formed by the coincidence of output pulses from recirculating lines, a coincidence gate is necessary. Such a gate 54-1 (Fig. 14) is employed to derive the pulse for the 27-pulse-timed delay line just described. The gate comprises a pentode vacuum tube 166 with input circuits applied to control electrodes Nos. 1 and 3. Tube 166 has a cathode potential of −34 volts with a potential of −50 volts applied to both control electrodes, thereby producing a bias of −16 volts below the cathode. The input pulse from delay line 50 is applied to terminal 167 and when such a pulse is received alone, its amplitude is not sufficient to cause tube 166 to conduct. The pulse derived from delay line 51 is applied to terminal 168 and has the same characteristics. The pulses from line 50 are applied over one input circuit every 13 pulses, while the pulses applied from line 51 occur every 7 pulses. The only time that these pulses are in coincidence is at the start of the operation and every 91st pulse time thereafter. When the pulses from these two lines arrive in timed coincidence, their combined values applied to tube 166 render the tube conducting and the voltage of the anode drops from +90 volts to +70, thereby sending a negative-going pulse over conductor 170 to the normally conducting tube 171. This pulse causes the tube to be cut off and sends a positive pulse over conductor 172 to tube 173 which is part of cathode-follower amplifier stage 54-3. The result of this action is a positive pulse sent over conductor 174 to the 27-pulse-timed delay line 54. Similar coincidence gates are used to obtain other pulses that do not lie within the range provided by the 27-pulse-timed delay circuit and which are necessary for the operation of the computer. These pulses are derived by a coincidence gate circuit which is identical to the gate 54-1 just described, but it is not always necessary to include an inverter as part of the circuit. A similar coincidence gate 76 is employed in a checking circuit, shown in Figs. 15 and 17, to check the timing and operation of pulse lines 52, 53, and 54. This coincidence gate receives a pulse which has been delayed 7 pulse times from delay circuit 53-8 and also a pulse which has been delayed 6 pulse times from delay circuit 52-5. These pulses are applied to the input circuits of gate 76 in the same manner as pulses were applied to input circuits 167 and 168 shown in Fig. 14; then applied to an inverter stage 78, which is similar to inverter stage 54-2, and then applied to a buffer stage 74.

*Checking circuits (Figs. 15, 16 and 17)*

Figure 15:
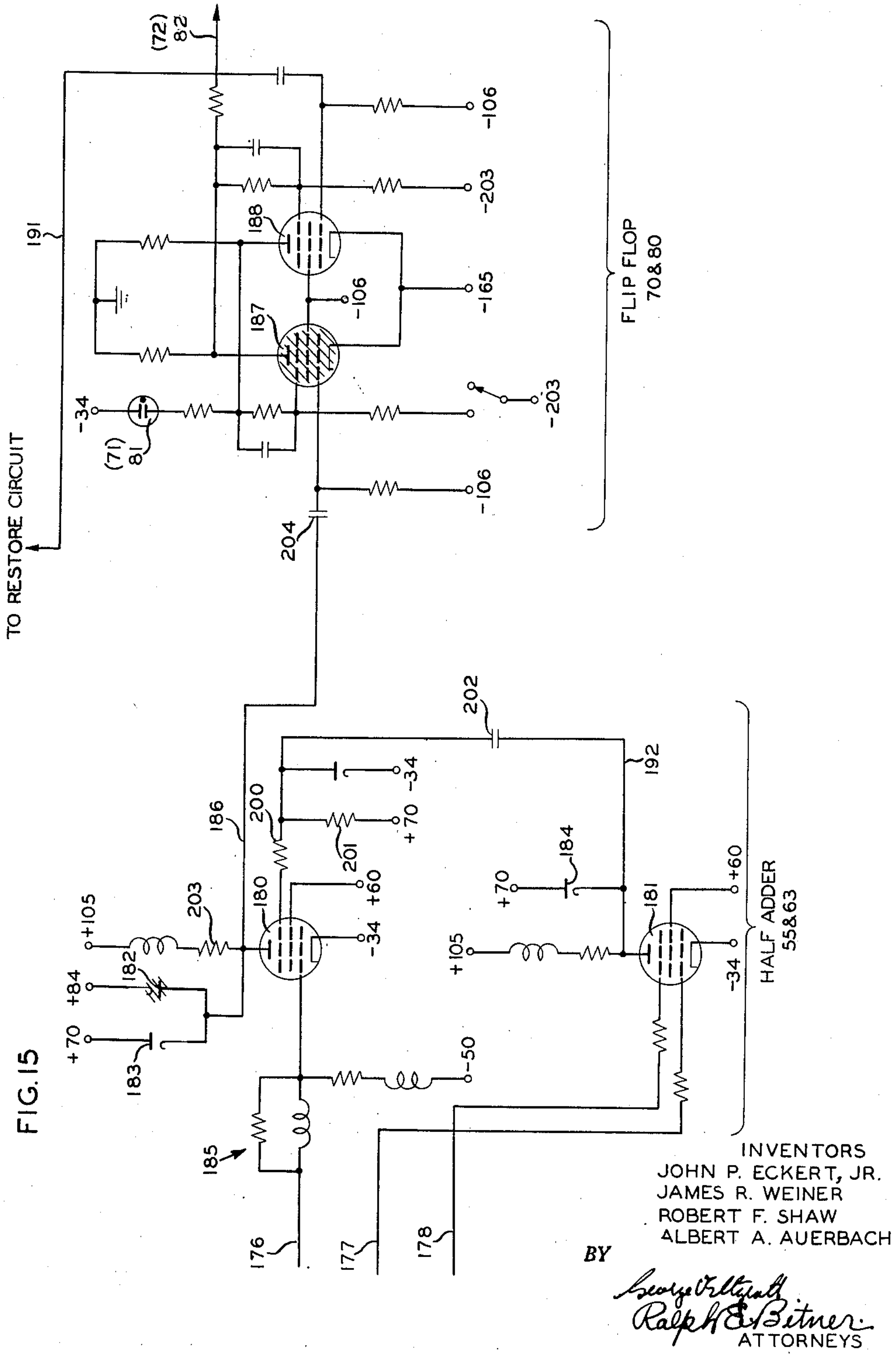
Figure 15 is a detailed schematic diagram of connections showing a half adder and flip-flop circuit used in the checking arrangements.
Figure 16:
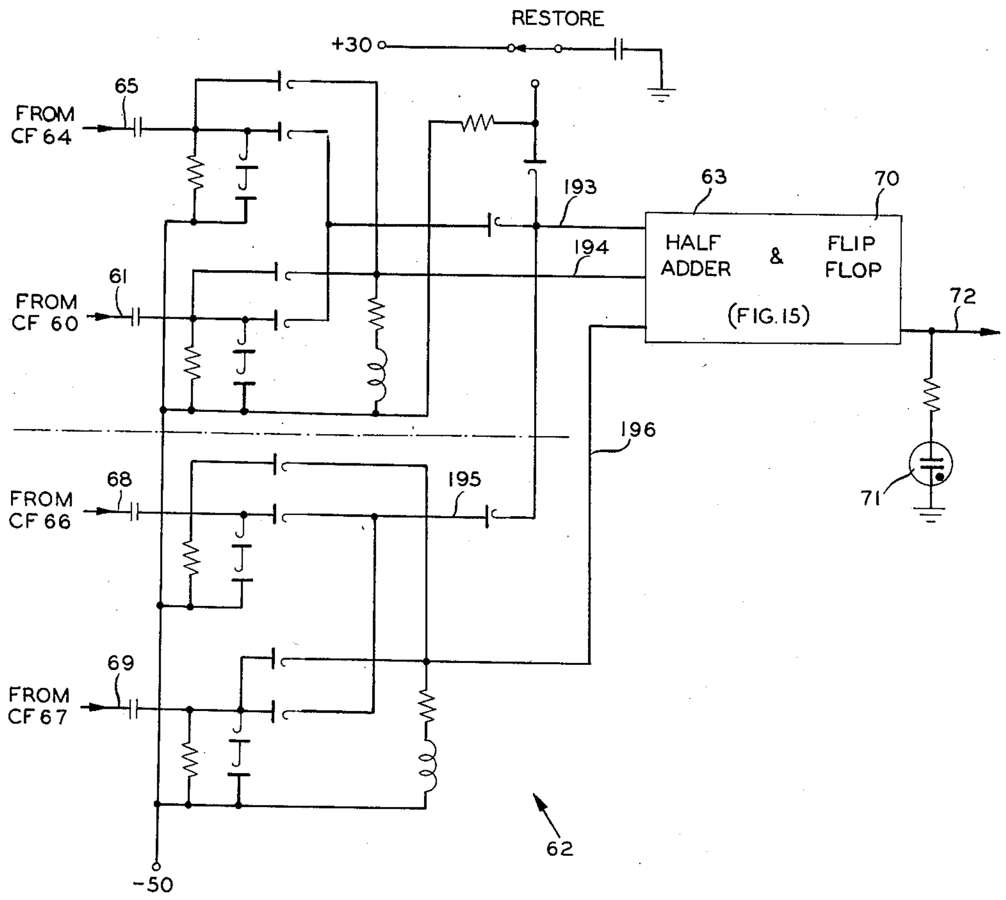
Figure 16 is a schematic diagram of connections of one of the checking circuits with the half adder and flip-flop shown in block.
Figure 17:
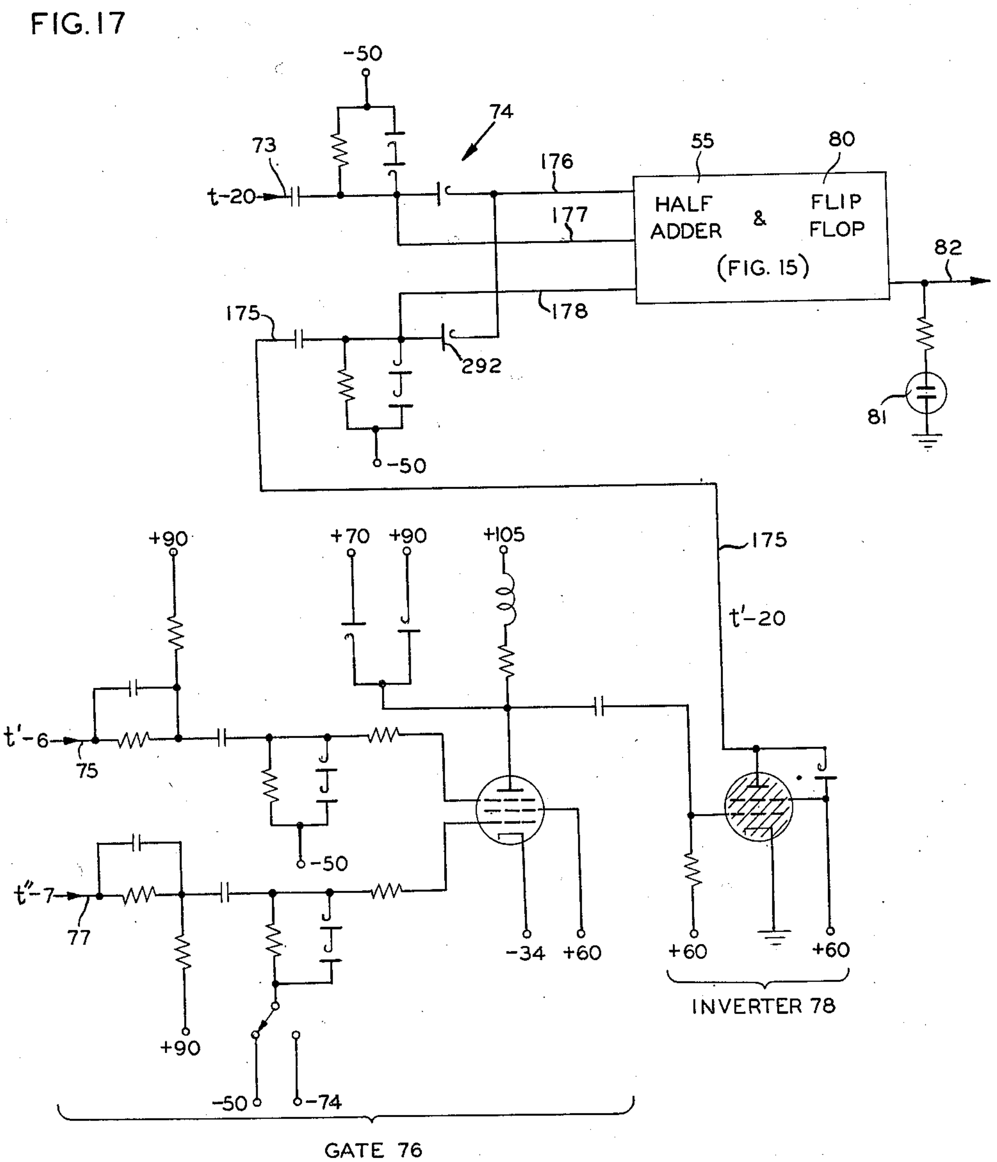
Figure 17 is a schematic diagram of connections of the other checking circuit with parts shown in block.

Two checking circuits are employed to test the operation of the components of the cycling unit. The first of these comprises a buffer circuit 62, a half-adder 63, and a flip-flop 70. The second includes a coincidence gate 76, an inverter stage 78, a buffer circuit 74, a half-adder 55, and a flip-flop 80. These circuits are shown in block representation in Fig. 5. Details of the gate 76, inverter 78, and buffer circuit 74 are shown in Fig. 17. Details of buffer circuit 62 are shown in Fig. 16 and the details of half-adder circuits 55 and 63 and flip-flop circuits 70 and 80. Referring now to Figs. 17 and 15, the gate 76 and inverter 78 are substantially the same as gate 54-1 and inverter 54-2 described previously. The output of inverter 78 is transmitted over an anode conductor 175 and is connected through a coupling capacitor to the lower half of a buffer stage 74. The second pulse derived from the end of the 27-pulse-timed delay line is applied over conductor 73 to the upper half of buffer stage 74. The output of the buffer stage is transmitted over three conductors 176, 177 and 178; conductor 176 being a common output conductor for both buffer input circuits. These three conductors are applied to the half-adder circuit shown in Fig. 15. The half-adder stage comprises two pentode vacuum tubes 180 and 181. Both of these tubes are biased by a −50 volt supply so that they are normally nonconducting. The anode of pentode 180 is normally at +84 volts, being held there by a limiting diode 182 and is prevented from going below +70 volts by another diode limiter 183. Pentode tube 181 is likewise limited to a +70 volts when it conducts by a diode limiter 184. A delay circuit 185, comprising an inductor and a resistor in parallel, is in series with the common input conductor 176 to hold back the signal arriving on that conductor for a short time interval before being applied through the control electrode of tube 180. The output of the half-adder stage is applied over conductor 186, through a coupling capacitor, to the flip-flop circuit. This circuit is of conventional design and need not be described in detail. It includes the usual two tubes 187 and 188, only one of which is conducting at any time. When an output negative pulse is transmitted over conductor 186, the flip-flop circuit is actuated and conductance is transferred from tube 187 to tube 188, thereby sending out a positive rise in voltage over conductor 82 which is connected to a control circuit that stops the machine. At the same time, the anode voltage of tube 188 is lowered, increasing the potential across the terminals of neon lamp 81, causing it to light and indicate that the flip-flop circuit has been actuated and the computing operation has been stopped. The flip-flop circuit is restored to its normal condition by a restorer switch shown in block form in Fig. 5 which acts through a buffer circuit 190 and applies a negative pulse over conductor 191 to restore the flip-flop circuit and permit the operation of the computer to continue.

The operation of the buffer circuit 74 and half-adder circuit 55 is as follows: Let it be assumed that a positive pulse is transmitted over conductor 175 through the lower part of buffer circuit 74. This will apply a positive pulse over conductor 178 and also apply a positive pulse through diode 292 to conductor 176. The single pulse sent over conductor 178 will be applied to grid No. 3 in pentode tube 181, but will cause no result since grid No. 1 remains at a potential of −50 volts and inhibits tube conductance. The positive pulse applied over common conductor 176 will be delayed a slight amount by circuit 185 and then applied to the No. 1 grid of tube 180. Since the grid No. 2 is at +60 volts and grid No. 3 is at cathode potential, the tube will conduct for the duration of the input pulse and send a negative-going pulse of 14 volts amplitude over conductor 186 to the flip-flop circuit, actuating it and stopping the computer action as described above. It will be obvious that the same action would occur if a single pulse had been received over conductor 73 and applied to the upper half of buffer circuit 54. In this case, positive pulses would have been sent over conductor 177 and common conductor 176 with the same action as before, causing the flip-flop circuit to be actuated. If, however, positive pulses are received simultaneously on conductors 73 and 175, positive pulses are then transmitted on all three input conductors 176, 177, and 178 to the half-adder circuit. Pulses 177 and 178, both being applied to pentode tube 181, will cause this tube to conduct and send a negative pulse over conductor 192, through a coupling capacitor, to the No. 3 grid of pentode tube 180, lowering the potential of that grid to a point where the tube will not conduct, even though a positive potential is applied to the No. 1 grid. The negative pulse sent over conductor 192 will arrive at tube 180 a short interval of time before the positive pulse transmitted over conductor 176, due to the fact that the latter pulse is delayed a small interval of time by delay circuit 185. Under these circumstances, tube 180 will not conduct and no pulse of any kind will be sent over conductor 186 to the flip-flop circuit.

From the above description and the details of the timing pulses which have been described in connection with the delay lines, it will be evident that a checking system operates to test the coincidence of a timing pulse derived from the end of the 27-pulse-timed delay line and the coincidence pulse derived from No. 6 pulse from delay line 52 and No. 7 pulse from delay line 53. The latter pulses will be in coincidence only at a time 20 and if this coincidence does not occur, the machine will be stopped. If any one of the delay lines 52, 53, or 54 does not operate or is out of time, coincidence will not occur; the half-adder 55 will produce a pulse and the flip-flop 80 will be actuated.

A similar checking circuit is employed to test the operation and timing of circuits 50, 51, 52, and 53. Output pulses are taken through cathode-follower amplifiers 64, 60, 66, and 67 over four conductors 61, 65, 68, and 69 and applied to a buffer circuit 62 shown in detail in Fig. 16. This buffer circuit has four input conductors and four buffer circuits, being substantially equivalent to twice the buffer equipment as shown in Fig. 17. The buffer circuits, having inputs from conductors 65 and 61, are arranged for parallel operation and their output circuit includes a common conductor 193 and a single output conductor 194. The other two buffer circuits are also in parallel, having their common conductor 195 coupled through a diode to common conductor 193 and also having a single output conductor 196. If now an input pulse is applied over conductor 65 and another time coincident pulse over conductor 68, positive pulses will be sent to the half-adder over the common conductor 193 and over conductors 194 and 196 and the half-adder 63 and flip-flop 70 will operate exactly in the same manner as described above in connection with Fig. 17. Also, if pulses are applied to buffer circuit 62 over conductors 61 and 69 simultaneously, the action will be the same. It should be obvious, from the drawing and from the descriptions given, that a pulse applied to either one of conductors 65 and 61, when time coincident with a pulse applied to either one of conductors 68 and 69, will be absorbed in the half-adder and cause no output to the flip-flop circuit. Also, a single pulse applied to either conductor 65 or 61 in conjunction with the simultaneous application of two pulses, one on 68 and 69, will provide the same result and, in like manner, four pulses on all four input lines will again result in no output pulse from the half-adder. When the circulating unit is working properly, four pulses will be applied over the four input conductors at the start of each word; that is, at a pulse time equal to zero. Thereafter, during the 91 pulse times which make up the word formation, a pulse will be applied over conductors 61 and 68 every 7th pulse and pulses will be applied over conductors 65 and 69 every 13th pulse. This checking circuit insures that delay lines 50, 51, 52 and 53 keep in step during the entire operation of the computing device.

The following circuit constants may be used in the circuit shown in Fig. 8 and are illustrative of a specific application of the invention:

| | |
|---|---|
| Vacuum tubes **140**, **83**, **84**, and **86** | Type 25L6. |
| Crystal diodes **152** to **155** | Type IN48. |
| Anode resistor for tube **140** | 7,500 ohms. |
| Anode resistors for tubes **83** and **84**. | 560 ohms. |
| Resistors in series with grids | 33 ohms. |
| Delay line **141** | Res.=6,200 ohms, inductance = 42.5 microhenries. |
| Resistor between point 146 and −190 volt terminal. | 37,700 ohms. |

In a similar manner, the following circuit constants may be used in the circuit shown in Fig. 15:

| | |
|---|---|
| Vacuum tubes **180**, **181**, **187**, and **188**. | Type 25L6. |
| Crystal diodes | All type IN48. |
| Delay line **185** | Resistance = 2,200 ohms, inductance= 79 microhenries. |
| Resistor in series with grids in tube **181**. | 330 ohms. |
| Resistor **200** | 330 ohms. |
| Resistor **201** | 100,000 ohms. |
| Capacitor **202** | .03 microfarad. |
| Resistor **203** | 2,200 ohms. |
| Coupling capacitor **204** | .03 microfarad. |

The above description and operations have been confined to a particular illustrative example in which the length of the word included 91 pulse times and the two recirculating delay lines comprised delay times of 7 and 13. It is obviously possible to use any two delay lines having delay times which are prime to each other for the production of pulses up to and including the product of the delay times furnished by the two recirculating lines. As an example, two recirculating delay lines having delay times of 5 and 9 could be employed to produce delay pulses occurring at any time up to and including 45 pulse times. The number of pulse times delay in the two lines need not be prime numbers, but must only be prime to each other; as, for example, two lines having delay times of 9 and 10 pulse times could be used to produce delay pulses having an elapsed time of 90 or any other delay time between 1 and 90.

While there have been described and illustrated, specific embodiments of the invention, it will be obvious that various changes and modifications may be made therein without departing from the field of the invention which should be limited only by the scope of the appended claims.

What is claimed is:

1. A pulse cycling circuit for producing one or more pulses, each occurring a predetermined time interval after an initial event, comprising; a first recirculating delay line having a feedback connection between two of its terminals and providing pulses during a first delay cycle; a second recirculating delay line having a feedback connection between two of its terminals and providing pulses during a second delay cycle of different length; and a coincidence gate, connected to a selected point on each of said lines, for producing an output pulse only at the time the pulses derived from each of said lines occur simultaneously.

2. A pulse cycling circuit for producing one or more pulses, each occurring a predetermined time interval after an initial event, comprising; a first recirculating delay circuit for providing pulses at terminals on a delay line therein during a first delay cycle and having a feedback connection between said delay line and its input; a second recirculating delay circuit for providing pulses at terminals on a delay line therein during a second delay cycle of different length and having a feedback connection between said delay line and its input; and a coincidence gate, connected to one terminal on each of said delay lines, for producing an output pulse only at the time the pulses derived from each of said lines occur simultaneously.

3. A pulse cycling circuit for producing one or more pulses, each occurring at a predetermined time interval after an initial event, and each of said pulses available at a terminal point which is exclusive of other pulses, comprising; a first recirculating delay circuit for providing pulses at terminals on a delay line therein during a first delay cycle and having a feedback connection between said delay line and its input; a second recirculating delay circuit for providing pulses at terminals on a delay line therein during a second delay cycle of different length and having a feedback connection between said delay line and its input; and a coincidence gate, connected to one terminal on each of said delay lines, for producing an output pulse only at the time the pulses derived from each of said lines occur simultaneously.

4. A pulse cycling circuit for producing one or more pulses, each occurring at a predetermined time interval after an initial event, comprising; a first recirculating delay line for producing $m$ pulses during a first delay cycle; a second recirculating delay line for producing $n$ pulses during a second delay cycle of different length; and at least one coincidence gate connected to respective points on both of said delay lines, which can produce any one of $mn$ output pulses.

5. A pulse cycling circuit for producing one or more pulses, each occurring at a predetermined time interval after an initial event, comprising; a first recirculating delay line for producing $m$ pulses during a first delay cycle; a second recirculating delay line for producing $n$ pulses during a second delay cycle of different length; at least one coincidence gate having two input circuits, one of said input circuits connected to a respective terminal on the first delay line, and the second of said input circuits connected to a respective terminal on the second delay line; and an output circuit in said gate for producing any one of $mn$ pulses exclusive of any other pulse.

6. A pulse cycling circuit for producing one or more pulses, each occurring at a predetermined time interval after an initial event, comprising; a first recirculating delay line for producing $m$ pulses during a first delay cycle and each cycle thereafter; a second recirculating delay line for producing $n$ pulses during a second delay cycle of different length and each cycle thereafter; each of said pulses available at terminals on the delay lines; at least one coincidence gate having two input circuits, one of said input circuits connected to a respective terminal on the first delay line, and the second of said input circuits connected to a respective terminal on the second delay line; and an output circuit in said gate for producing any one of $mn$ pulses exclusive of any other pulse during a third time interval which has a duration equal to the product of the durations of the first and second intervals.

7. A pulse cycling circuit for producing one or more pulses, each occurring a predetermined time interval after an initial event, comprising; a first recirculating delay circuit for providing pulses during a first delay cycle; a second recirculating delay circuit for providing pulses during a second delay cycle of different length; each of said delay circuits including an amplifying means coupled to a delay line which consists of a plurality of inductors in series connection and a plurality of capacitors connected between inductor terminals and a common conductor, and circuit means for connecting the end of the delay line to the amplifying means to form a closed loop; and a coincidence gate, connected to a terminal on each of said delay lines for producing an output pulse only at the time the pulses derived from each terminal occur simultaneously.

8. A pulse cycling circuit for producing one or more pulses, each occurring a predetermined time interval after an initial pulse has been introduced to the circuit, comprising; a first recirculating delay circuit for providing reduced velocity for said initial pulse around a closed loop during a first delay cycle and each cycle thereafter; a second recirculating delay circuit for providing reduced velocity for said initial pulse around a closed loop during a second delay cycle of different length and each cycle thereafter; each of said delay circuits including an amplifying means coupled to a delay line which consists of a plurality of inductors in series connection and a plurality of capacitors connected between inductor terminals and a common conductor, and circuit means for connecting the end of the delay line to the amplifying means to form a closed loop; and a coincidence gate, connected to a terminal on each of said delay lines for producing an output pulse only at the time the pulses derived from each terminal occur simultaneously.

9. A recirculating delay circuit comprising; a delay line which includes a plurality of inductors in series connection and a plurality of capacitors connected between inductor terminals and a common conductor; an amplifying means having its output circuit coupled to an input end of the delay line; a clock gate circuit for retiming a recirculated pulse comprising, a coupling circuit connected to an output end of the delay line, and a gate circuit for introducing a control pulse from a master oscillator; and a flip-flop circuit actuated by the clock gate circuit in response to a coincident application of said recirculated pulse and said control pulse for producing a retimed and reformed pulse which is applied to an input circuit of the amplifying means.

10. A recirculating delay circuit comprising; a delay line which reduces the velocity of an electric pulse traveling from a pair of input terminals to a pair of output terminals; an amplifying means connected to the input terminals of the delay line; a clock gate circuit connected to the output terminals of the delay line for retiming a recirculated pulse and including means for introducing a control pulse from a master oscillator; a flip-flop circuit connected to the amplifying means and actuated by the clock gate circuit in response to a coincident application of said recirculated pulse and said control pulse; and an input circuit connected to the clock gate and controlled by the master oscillator for introducing a start pulse into the delay circuit.

11. A recirculating delay circuit comprising; a delay line which reduces the velocity of an electric pulse traveling from a pair of input terminals to a pair of output terminals; an amplifying means connected to the input terminals of the delay line; a clock gate circuit connected to the output terminals of the delay line for retiming a recirculated pulse and including means for introducing a control pulse from a master oscillator; a flip-flop circuit connected to the amplifying means and actuated to a set condition by the clock gate circuit in response to a coincident application of said recirculating pulse and said control pulse; and circuit means for actuating the flip-flop circuit to a restored condition by the next succeeding master oscillator pulse; said two actuations of the flip-flop circuit causing the formation of a reformed and retimed pulse which is applied to the amplifying means for recirculation through the delay circuit.

12. A recirculating delay circuit comprising; a delay line which reduces the velocity of an electric pulse traveling from a pair of input terminals to a pair of output terminals; an amplifying means connected to the input terminals of the delay line; a clock gate circuit for retiming a recirculated pulse and including means for introducing a series of control pulses from a master oscillator; a flip-flop circuit connected to the amplifying means and actuated to a set condition by the clock gate circuit in response to a coincident application of said recirculating pulse and a pulse in said series of control pulses; circuit means for actuating the flip-flop circuit to a restored condition by the next succeeding master oscillator pulse; and adjustable circuit means at the output terminals of said delay line for deriving a pulse, the maximum amplitude of which approximately coincides in time sequence with a desired pulse from the master oscillator; said two actuations of the flip-flop circuit causing the formation of a reformed and retimed pulse which is applied to the amplifying means for recirculation through the delay circuit.

13. A pulse cycling circuit for producing one or more pulses, each occurring a predetermined time interval after an initial event, comprising; a first recirculating delay line for providing pulses during a first time interval; a second recirculating delay line for providing pulses during a second time interval; a coincidence gate, connected to both of said lines for producing an output pulse only at the time the pulses derived from each of said lines occur simultaneously; and a non-circulating delay line connected to the coincidence gate for providing an additional time delay for the pulse derived therefrom.

14. A pulse cycling circuit for producing one or more pulses, each occurring a predetermined time interval after an initial event, comprising; a first recirculating delay circuit including an amplifier and a delay line having output terminals in spaced relation thereon for providing pulses during a first time interval; a second recirculating delay circuit including an amplifier and a delay line having output terminals in spaced relation thereon for providing pulses during a second time interval; a coincidence gate having two input circuits and one output circuit, each of said input circuits connected to a terminal on one of the delay lines, and its output circuit connected to a non-circulating delay circuit which includes an amplifier and a delay line having output terminals in spaced relation thereon for providing pulses which occur during a third time interval.

15. A pulse cycling circuit for producing one or more pulses, each occurring a predetermined time interval after an initial event, comprising; a first recirculating delay line for providing pulses during a first time interval; a second recirculating delay line for providing pulses during a second time interval; and a checking circuit for ensuring that pulses arrive at selected points in the two delay lines simultaneously, said checking circuit including a half-adder circuit having two input circuits and an output circuit and which produces a pulse in said output circuit in response to the receipt of a pulse in either one, but not in both of said two input circuits.

16. A pulse cycling circuit for producing one or more pulses, each occurring a predetermined time interval after an initial event, comprising; two recirculating delay lines for providing pulses during a first time interval; two other recirculating delay lines for providing pulses during a second time interval; a checking circuit for ensuring that pulses arrive at selected points in the four delay lines simultaneously; a half-adder circuit for sensing the simultaneous occurrence of pulses in two input conductors and arranged to send a pulse to an output circuit in response to the receipt of a pulse in only one of its two input circuits; and a buffer circuit connected between the four selected points in the delay lines and the two input conductors to the half-adder.

17. The combination according to claim 16 in which cathode follower amplifiers are interposed between said buffer circuit and said selected points in the delay lines; said cathode follower amplifiers each comprising a vacuum tube having an anode, a cathode, a control electrode and a screen electrode, a resistor connected to said cathode, a capacitor connected between said screen electrode and said cathode, and an input circuit for said tube connected to said control electrode.

18. A pulse cycling circuit for producing one or more pulses, each occurring a predetermined time interval after an initial event, comprising; a first set of recirculating delay lines, including; a first recirculating delay line for providing pulses during a first time interval; a second recirculating delay line for providing pulses during a second time interval; a coincidence gate, connected to both of said lines for producing an output pulse only at the time the pulses derived from each of said lines occur simultaneously; a non-circulating delay line connected to said coincidence gate for providing an additional time delay for the pulse derived therefrom; a second set of recirculating delay lines, including; a first recirculating delay line for providing pulses during said first time interval; a second recirculating delay line for providing pulses during said second time interval; and a checking circuit for ensuring that pulses arrive simultaneously at selected points in said non-circulating delay line and in said second set of recirculating delay lines, said checking circuit including a coincidence gate for receiving pulses from the selected points on the recirculating delay lines, and a half-adder circuit having two input circuits and one output circuit, said half-adder input circuits respectively connected to a selected point on the non-circulating delay line and to the output circuit of the last named coincidence gate, the half-adder circuit arranged to produce a pulse in its output circuit in response to the receipt of a pulse in only one of its input circuits.

19. The combination according to claim 18 in which a cathode follower amplifier is interposed between one of said half-adder input circuits and said selected point on said non-circulating delay line; said cathode follower amplifier comprising a vacuum tube having an anode, a cathode, a control electrode and a screen electrode, a resistor connected to said cathode, a capacitor connected between said screen electrode and said cathode, and an input circuit for said tube connected to said control electrode.

20. A pulse cycling unit for producing one or more pulses, each occurring at a predetermined time interval after an initial event, comprising; a first set of recirculating delay lines, each of said delay lines providing pulses at different time intervals; a non-circulating delay line connected to said recirculating delay lines through a coincidence gate and providing an additional time delay for the pulse derived therefrom; a second set of recirculating delay lines, each of said delay lines providing pulses at different time intervals; a first checking circuit for ensuring that pulses arrive simultaneously at selected points in said recirculating delay lines of said first and second set; a half-adder circuit in said first checking circuit for sensing the simultaneous occurrence of pulses in two input conductors and arranged to provide an output pulse in response to the receipt of a pulse in only one of said two input conductors; a buffer circuit connected between said selected points in said recirculating delay lines and said two input conductors to said half-adder; a second checking circuit for ensuring that pulses arrive simultaneously at selected points in said non-circulating delay line and said recirculating delay lines in said second set, said second checking circuit including a coincidence gate for receiving pulses from selected points on said recirculating delay lines in said second set, and a half-adder circuit in said second checking circuit having two input circuits and one output circuit, said half-adder input circuits respectively connected to a selected point on said non-circulating delay line and to the output circuit of the last-named coincidence gate, said half-adder circuit arranged to provide an output pulse in response to the receipt of a pulse in only one of its two input circuits.

21. A half-adder checking circuit for sensing the simultaneous occurrence of two pulses comprising, two input circuits connected respectively between sources of said pulses and a coincidence stage which is made conductive only when both of said pulses are applied simultaneously to the input circuits, an amplifier stage independently connected to both of the input circuits and arranged for conductance when a pulse is applied to either one, a control circuit in the amplifier stage connected to an output circuit in the coincidence stage for preventing conductance in said amplifier stage when the coincidence stage is conductive, and an output circuit connected between the amplifier stage and a utilization means for transmitting a pulse when the amplifier stage is conductive.

22. A half-adder checking circuit for sensing the simultaneous occurrence of two pulses and indicating a lack of coincidence comprising, two input circuits connected respectively between sources of said pulses and a coincidence stage which is made conductive only when both of said pulses are applied simultaneously to the input circuits, an amplifier stage with a control electrode connected to both of said input circuits for producing conductance when a pulse is applied to either of said input circuits, a second control electrode in the amplifier stage connected to an output circuit in the coincidence stage for preventing conductance in the amplifier stage when the coincidence stage is conductive, and a flip-flop circuit connected to the output circuit of the amplifier stage for indicating that an output pulse has been received from the amplifier stage.

23. A half-adder checking circuit for sensing the simultaneous occurrence of two pulses and for indicating a lack of coincidence comprising; two input circuits connected by diode buffers between sources of said pulses and two control electrodes in a coincidence stage which is made conductive only when both of said pulses are applied simultaneously thereto, an amplifier stage having a first control electrode connected through diode buffers and a delay circuit to both of said two input circuits for producing conductance when a pulse is applied to either one of said input circuits, a second control electrode in the amplifier stage coupled to an anode in the coincidence stage for preventing conductance in the amplifier stage when the anode passes a current pulse, and a flip-flop circuit coupled to an anode in the amplifier stage for indicating the lack of pulse coincidence and for operating a control circuit.

24. A pulse cycling circuit for producing one or more pulses, each occurring at a predetermined time interval after an initial event comprising; a first recirculating delay line having a feedback connection between two of its terminals and producing $m$ pulses during a first delay cycle; a second recirculating delay line having a feedback connection between two of its terminals and producing $n$ pulses during a second delay cycle of different length; at least one coincidence gate connected to respective points on both of said delay lines, which can produce any one of $mn$ pulses in an output circuit; and a start circuit for applying a start pulse to the first and second delay lines.

25. A pulse cycling circuit for producing one or more pulses, each occurring at a predetermined time interval after an initial event, comprising; a master oscillator for producing a series of control pulses; a first recirculating delay line having a feedback connection between two of its terminals and providing a pulse delay equal in duration to $m$ periods of the master control pulses; a second recirculating delay line having a feedback connection between two of its terminals and providing a pulse delay equal to $n$ periods of the control pulses; and at least one coincidence gate connected to respective points on both of said delay lines, which can produce a pulse having a delay time equal in duration to $mn$ periods of the control pulses.

26. A pulse cycling circuit for producing one or more pulses, each occurring at a predetermined time interval after an initial event, comprising; a master oscillator for producing a series of control pulses; a first recirculating delay line having a feedback connection between two of its terminals and providing a pulse delay equal in duration to $m$ periods of the master control pulses; a second recirculating delay line having a feedback connection between two of its terminals and providing a pulse delay equal to $n$ periods of the control pulses; at least one coincidence gate connected to respective points on both of said delay lines, which can produce a pulse having a delay time equal in duration to $mn$ periods of the control pulses; and a start circuit, controlled by the control pulses from the master oscillator and a manual switching arrangement, for applying a start pulse to the first and second delay lines.

27. A pulse cycling circuit for producing one or more pulses, each occurring at a predetermined time interval after an initial event, comprising; a master oscillator for producing a series of control pulses; a first recirculating delay line for providing a pulse delay equal in duration to $m$ periods of the master oscillator control pulses; a second recirculating delay line for providing a pulse delay equal to $n$ periods of the master oscillator control pulses; one or more coincident gates, each connected to respective points on both of said delay lines, which can produce a pulse having a delay time equal in duration to $mn$ periods of the control pulses; and a start circuit, controlled by the control pulses from the master oscillator and a manual switching arrangement, for applying a start pulse to the first and second delay lines; said switching arrangement including a first switch which conditions a flip-flop circuit to respond to pulses from the master oscillator and a second switch which conditions an amplifier stage to transmit the generated start pulse to the delay lines.

28. A pulse cycling circuit for producing one or more pulses, each occurring in a predetermined time interval after an initial event, comprising; a first recirculating delay line for providing pulses during a first time interval; a second recirculating delay line for providing pulses during a second time interval; and a coincidence gate, connected to both of said delay lines, for producing an output pulse only at the time the pulses derived from each of said lines occur simultaneously; the output from said coincidence gate being fed to a cathode follower amplifier; said cathode follower amplifier comprising a vacuum tube having an anode, a cathode, a control electrode, and a screen electrode, a resistor connected to said cathode, a capacitor connected between said screen electrode and said cathode, and an input circuit for said tube connected to said control electrode.

29. The combination according to claim 28 comprising an inverter interposed between said coincidence gate and said cathode follower amplifier.

References Cited in the file of this patent

UNITED STATES PATENTS

| | | |
|---|---|---|
| 2,510,167 | Boothroyd | June 6, 1950 |
| 2,522,609 | Gloess | Sept. 19, 1950 |
| 2,573,446 | Ignalls | Oct. 30, 1951 |
| 2,577,536 | MacNichols | Dec. 4, 1951 |
| 2,602,140 | Fink | July 1, 1952 |
| 2,663,798 | Hershberger | Dec. 22, 1953 |

FOREIGN PATENTS

| | | |
|---|---|---|
| 627,057 | Great Britain | July 27, 1949 |

OTHER REFERENCES

"How an electronic brain works," by Berkeley et al., from Radio Electronics, August 1951, pp. 48–49.